United States Patent
Maeda et al.

(10) Patent No.: US 11,052,448 B2
(45) Date of Patent: Jul. 6, 2021

(54) MEMBER JOINING DEVICE AND MEMBER JOINING METHOD

(71) Applicant: KOBE STEEL, LTD., Hyogo (JP)

(72) Inventors: Yasuhiro Maeda, Kobe (JP); Toru Hashimura, Kobe (JP); Kenichi Watanabe, Kobe (JP); Takayuki Kimura, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 203 days.

(21) Appl. No.: 16/488,560

(22) PCT Filed: Mar. 14, 2018

(86) PCT No.: PCT/JP2018/009926
§ 371 (c)(1),
(2) Date: Aug. 23, 2019

(87) PCT Pub. No.: WO2018/180489
PCT Pub. Date: Oct. 4, 2018

(65) Prior Publication Data
US 2020/0238365 A1    Jul. 30, 2020

(30) Foreign Application Priority Data

Mar. 27, 2017  (JP) .............................. JP2017-061664
Mar. 27, 2017  (JP) .............................. JP2017-061667

(51) Int. Cl.
*B21D 39/06* (2006.01)
*B62D 29/00* (2006.01)
*B21D 39/20* (2006.01)

(52) U.S. Cl.
CPC ............ *B21D 39/06* (2013.01); *B62D 29/008* (2013.01)

(58) Field of Classification Search
CPC ..... B21D 39/06; B21D 39/206; B62D 29/008
See application file for complete search history.

(56) References Cited

U.S. PATENT DOCUMENTS 3,823,216 A * 7/1974 Petzekinas .............. B29C 57/06
                                                       264/571
5,379,496 A * 1/1995 Krauss ................. A44B 11/266
                                                       24/115 G
(Continued)

FOREIGN PATENT DOCUMENTS

EP      3363555 A4 * 10/2019 ............. B21D 39/06
JP      S50-49158 A    5/1975
(Continued)

OTHER PUBLICATIONS

The extended European search report issued by the European Patent Office dated Dec. 1, 2020, which corresponds to European Patent Application No. 18778101.8-1016 and is related to U.S. Appl. No. 16/488,560.

*Primary Examiner* — Bayan Salone
(74) *Attorney, Agent, or Firm* — Studebaker & Brackett PC

(57) ABSTRACT

The member joining device includes: a tubular unit including a tubular assembly that is fixed, a flange portion whose position in a first central axis direction is fixed with respect to the tubular assembly; a shaft unit that includes a shaft assembly inserted into the tubular assembly in a linearly movable manner, and a protrusion portion whose position in a second central axis direction is fixed with respect to the shaft assembly, wherein the protrusion portion is positioned radially outside the first central axis of the tubular assembly, the protrusion portion faces the flange portion in the central axis direction; a rubber member arranged radially outside the tubular assembly, between the protrusion portion and the flange portion in the central axis direction; and a motion mechanism that moves the shaft unit in the central axis direction with respect to the tubular unit.

16 Claims, 34 Drawing Sheets

(56) References Cited

U.S. PATENT DOCUMENTS

| | | | |
|---|---|---|---|
| 2018/0015527 A1* | 1/2018 | Maeda | B21D 39/044 |
| 2019/0210088 A1* | 7/2019 | Maeda | B21D 39/044 |
| 2019/0210089 A1* | 7/2019 | Maeda | B21D 39/206 |

FOREIGN PATENT DOCUMENTS

| | | | |
|---|---|---|---|
| JP | S51-133170 A | | 11/1976 |
| JP | 2002282972 A | * | 10/2002 |
| WO | WO-2018180489 A1 | * | 10/2018 ........... B21D 39/206 |

\* cited by examiner

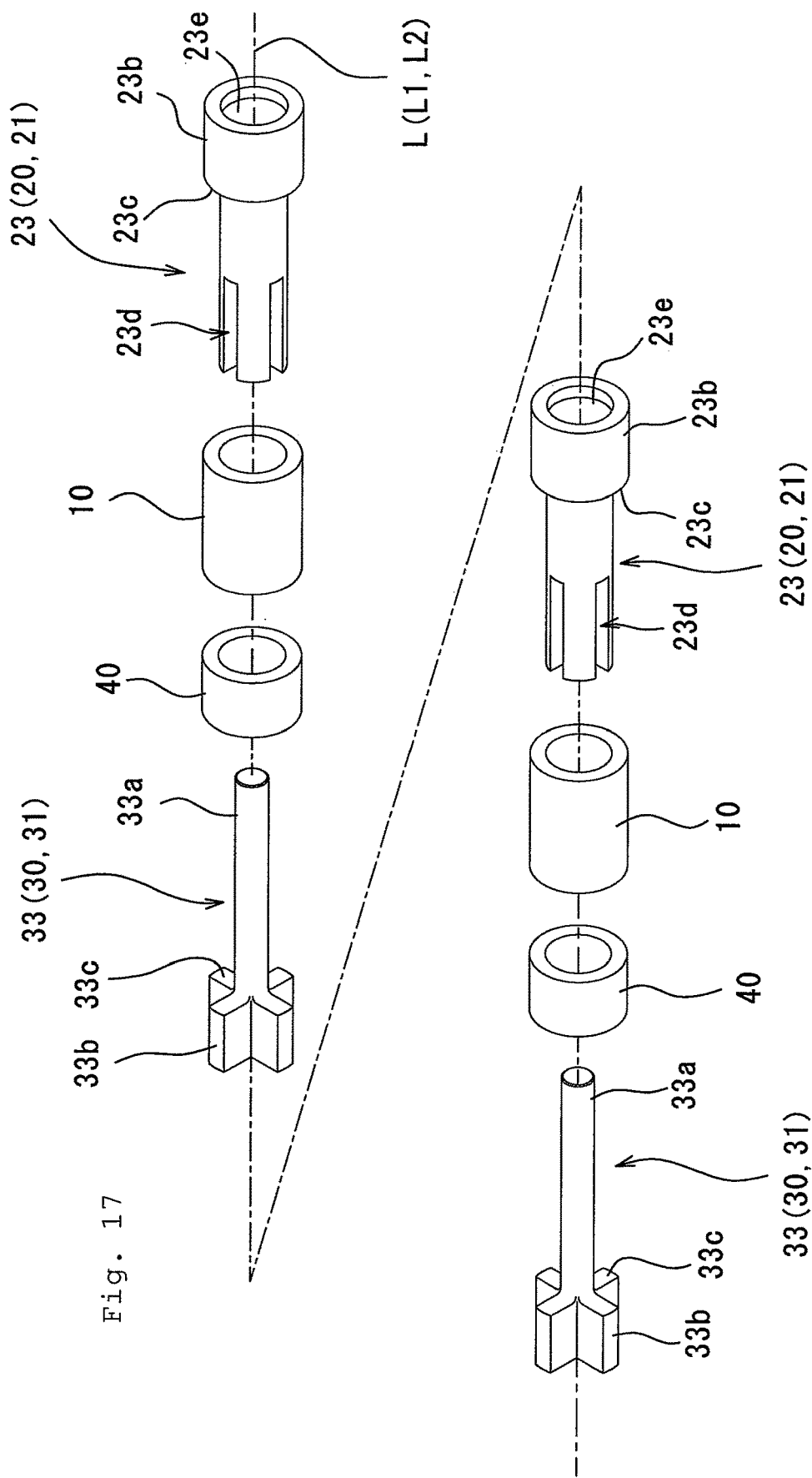

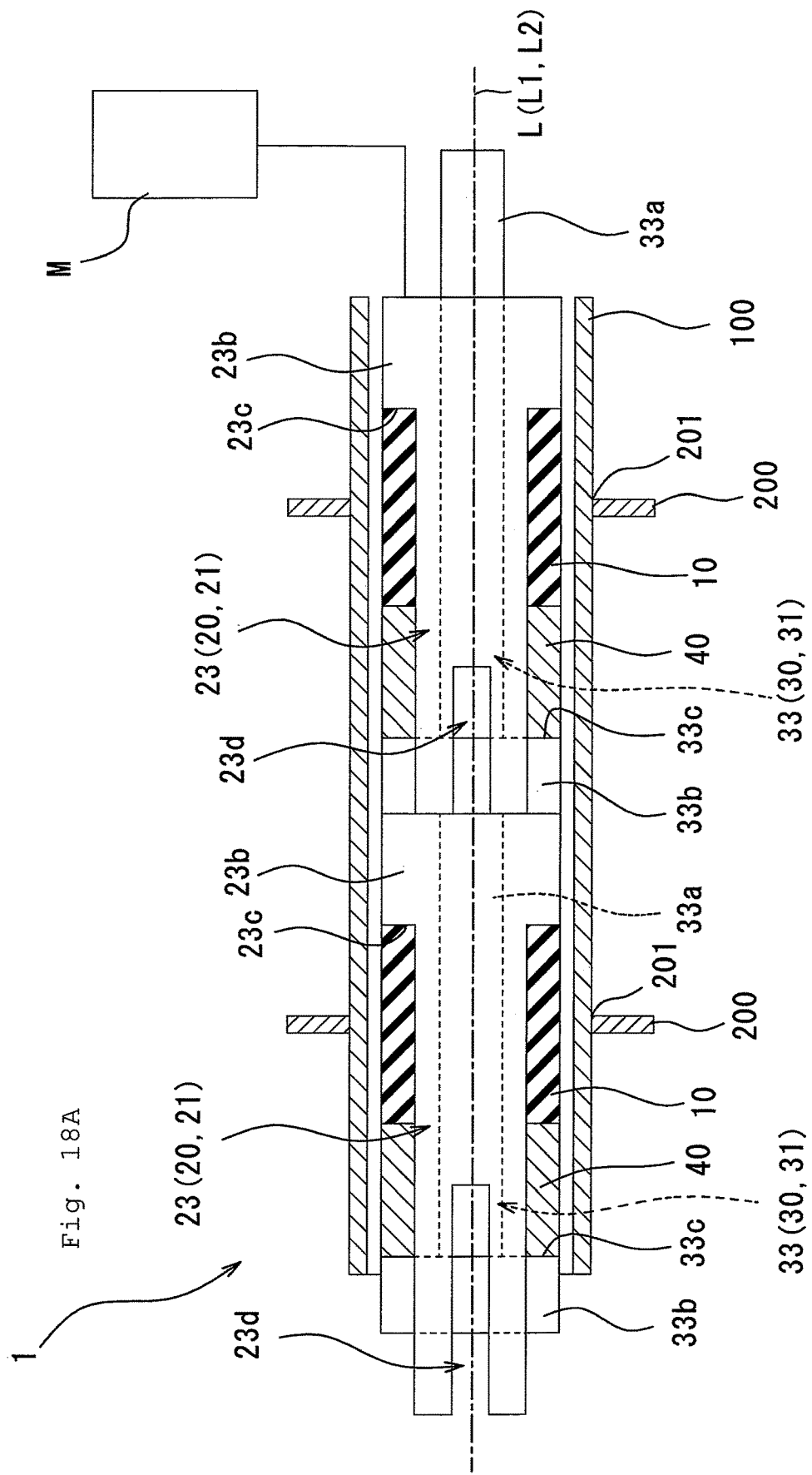

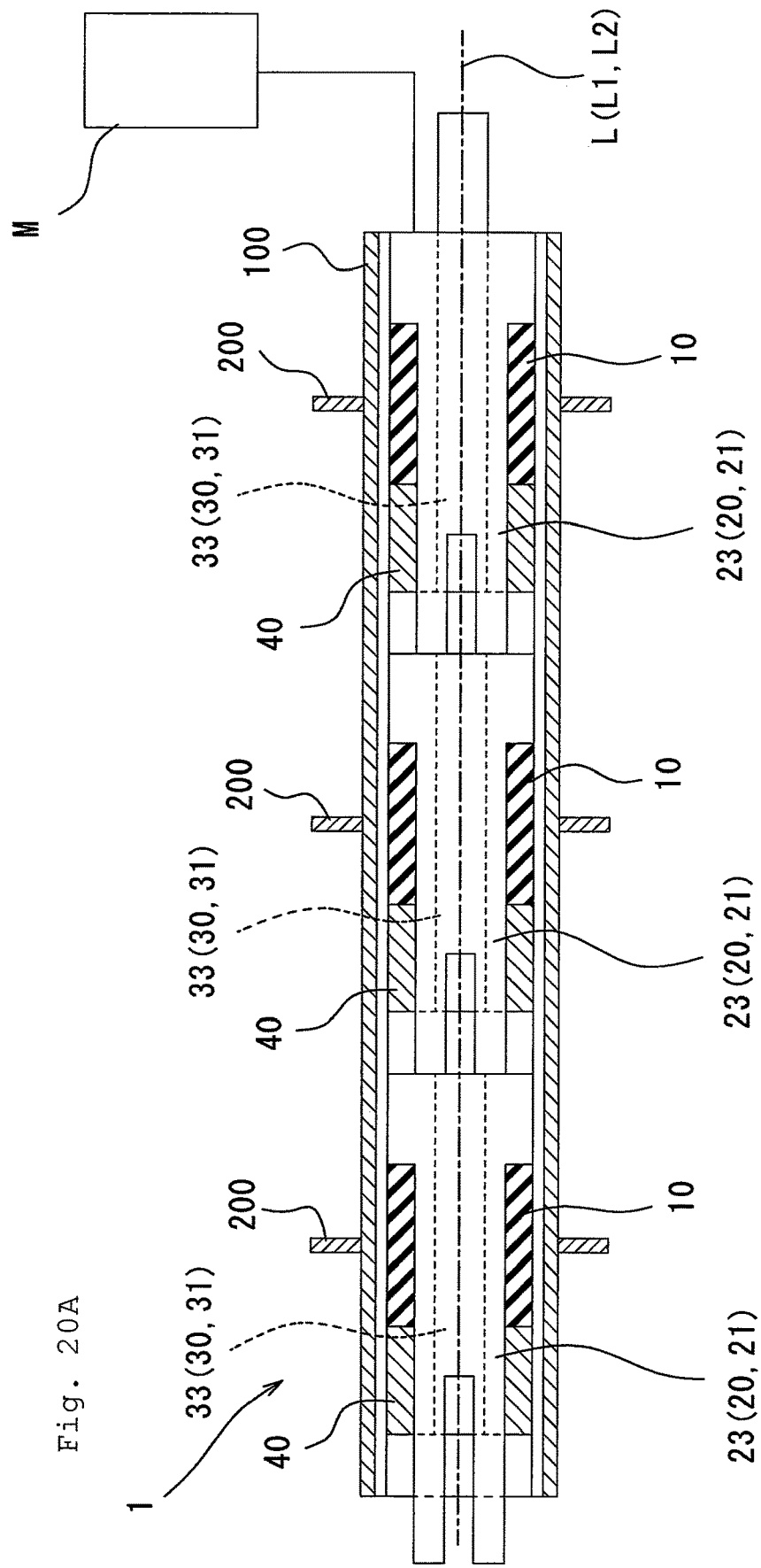

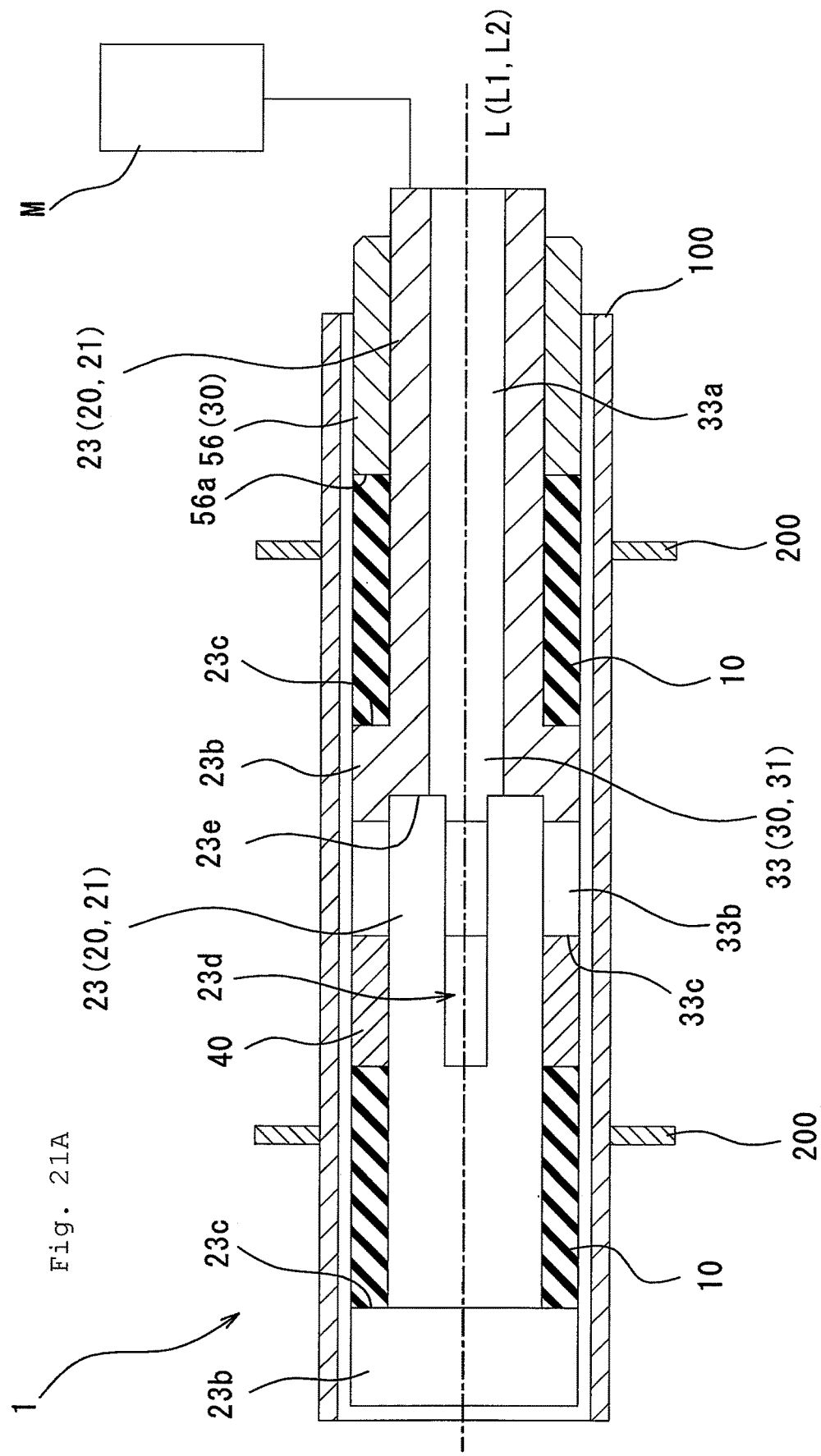

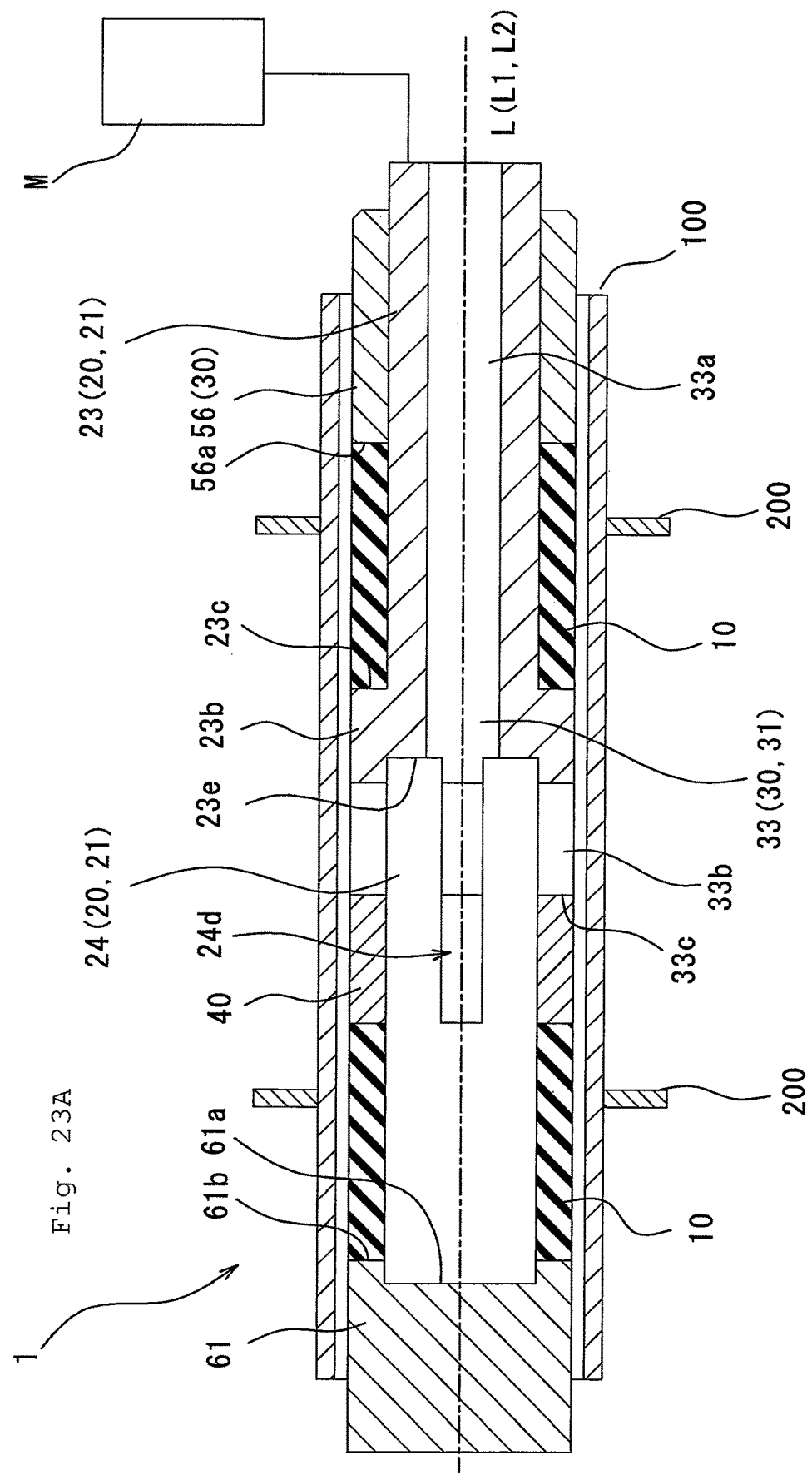

MEMBER JOINING DEVICE AND MEMBER JOINING METHOD

CROSS-REFERENCE TO RELATED APPLICATIONS

This is a national phase application in the United States of International Patent Application No. PCT/JP2018/009926 with an international filing date of Mar. 14, 2018, which claims priorities of Japanese Patent Applications No. 2017-061664 filed on Mar. 27, 2017 and No. 2017-061667 filed on Mar. 27, 2017 the contents of which are incorporated herein by reference.

TECHNICAL FIELD

The present invention relates to a member joining device and a member joining method.

BACKGROUND ART

A lower-density and high-strength metal called high-tension steel is used to reduce weight and improve safety of vehicles. Although the high-tension steel is effective in reducing weight and improving safety, it is heavier than a lower-density material such as an aluminum alloy. Because of its high strength, use of high-tension steel causes problems such as a decrease in formability, an increase in forming load, and a decrease in dimensional accuracy. In order to solve these problems, in recent years, extrusion materials, cast products, and press molded products of aluminum alloys having lower specific gravity than steel have been used for vehicle components. Since this aluminum alloy has a low specific gravity, it is effective for weight reduction but has a low strength. For this reason, there has been multi-materialization being carried out, in which steel components such as high-tension steel and aluminum alloy components are used in combination.

A problem in this multi-materialization is the joining of dissimilar metals such as steel components and aluminum alloy components. For example, JP 2016-147309 A discloses a member joining method that enables joining of dissimilar metals in the multi-materialization by using an elastic body. Specifically, in the member joining method of JP 2016-147309 A, an aluminum pipe is inserted into a hole portion of a steel component, a rubber member (elastic body) is inserted inside the aluminum pipe, and the rubber member is deformed by pressurizing, thereby expanding and deforming the aluminum pipe, and the steel component and the aluminum pipe are joined together by press-fitting.

SUMMARY OF THE INVENTION

Technical Problems

In the joining method of JP 2016-147309 A, simultaneous, accurate swaging and joining of a plurality of locations has not been studied in detail. When a plurality of locations are simultaneously swaged and joined with the joining method of JP 2016-147309 A, the positions of the rubber members arranged at the plurality of locations are shifted, which may make it impossible to perform the joining at accurate positions by press-fitting.

An object of the present invention is to provide a member joining device and a member joining method that are capable of simultaneously and accurately joining a tube body and a wall portion at a plurality of locations by press-fitting.

Means for Solving the Problems

A member joining device of a first aspect of the present invention includes:

a tubular unit that includes a tubular assembly that is fixed and has a first central axis, and a first receiving portion and a second receiving portion whose positions in a first central axis direction are fixed with respect to the tubular assembly;

a shaft unit that includes a shaft assembly that is inserted into the tubular assembly in a linearly movable manner and has a second central axis that extends in the same direction as the first central axis, and a first pressing portion and a second pressing portion whose positions in a second central axis direction are fixed with respect to the shaft assembly, wherein the first pressing portion and the second pressing portion are positioned radially outside the first central axis of the tubular assembly, the first pressing portion faces the first receiving portion in the first and second central axis directions, and the second pressing portion faces the second receiving portion in the first and second central axis directions;

a first elastic member arranged radially outside the first central axis of the tubular assembly, between the first pressing portion and the first receiving portion in the first and second central axis directions;

a second elastic member arranged radially outside the first central axis of the tubular assembly, between the second pressing portion and the second receiving portion in the first and second central axis directions; and a motion mechanism that moves the shaft unit in the first and second central axis directions with respect to the tubular unit.

According to this configuration, it is possible to simultaneously and accurately join the tube body and the wall portion at a plurality of locations by press-fitting in accordance with the following usage. First, the tube body is inserted into hole portions of a plurality of wall portions. Next, the member joining device is inserted inside the tube body. At this time, the first elastic member and the second elastic member (hereinafter, they are simply referred to as elastic members in some cases) are aligned with the hole portions of the respective wall portions in the first and second central axis directions (hereinafter they are simply referred to as central axes in some cases). Then, the motion mechanism moves the shaft unit in the central axis direction with respect to the tubular unit. In the above configuration, the first receiving portion and the second receiving portion (hereinafter they are simply referred to as receiving portions in some cases) are immovable in the central axis direction, and the first pressing portion and the second pressing portion (hereinafter they are simply referred to as pressing portions in some cases) are movable in the central axis direction. That is, movement of the shaft unit allows the pressing portion to approach the receiving portion, whereby the elastic member can be compressed in the central axis direction. With this compression, the elastic members are each expanded toward the radially outside the central axis, whereby the tube body is expanded, and the tube body is joined to the hole portion of the wall portion by press-fitting. Here, the radial direction of the central axis means the radial direction of the column when a column having the central axis is assumed.

In particular, in the above configuration, the tube body and the wall portion can be joined at a plurality of locations by press-fitting with the first elastic member, which is arranged between the first pressing portion and the first receiving portion, and the second elastic member, which is arranged between the second pressing portion and the second receiving portion. It is to be noted that the joining locations are not limited to two locations but may be three or more.

According to this configuration, since the positions of the first pressing portion and the second pressing portion in the central axis direction are fixed with respect to the shaft assembly, the first pressing portion and the second pressing portion move in synchronization with each other. Therefore, the joining at the plurality of locations by press-fitting can be performed simultaneously.

According to this configuration, since the elastic member is supported by the receiving portion, the position of the elastic member in the central axis direction does not change at the time of swaging and joining. Therefore, each of the plurality of elastic members can be deformed at an accurate position, and each portion of the tube body can be expanded at an accurate position. Accordingly, only a necessary portion of the tube body can be accurately expanded without expanding an unnecessary portion of the tube body, and hence the tube body can be accurately joined by press-fitting.

The tubular assembly may be provided with a slit that extends in the first central axis direction, and at least one of the first pressing portion and the second pressing portion penetrates the tubular assembly through the slit and protrudes radially outside the first central axis of the tubular assembly, and may be arranged to be linearly movable in the slit.

According to this configuration, since the slit in the tubular assembly is provided, at least one of the first pressing portion and the second pressing portion can protrude radially outside the central axis from the tubular assembly. Since the slit extends in the central axis direction and at least one of the first pressing portion and the second pressing portion is arranged to be linearly movable in the slit, the shaft assembly can be configured to be linearly movable in the central axis direction inside the tubular assembly. That is, it is possible to easily realize the configuration that includes the first receiving portion and the second receiving portion, which are immovable in the central axis direction, and the first pressing portion and the second pressing portion, which are movable in the central axis direction.

The member joining device may further include at least one of a first annular member that is arranged radially outside the first central axis of the tubular assembly, between the first pressing portion and the first elastic member in the first and second central axis directions, and a second annular member that is arranged radially outside the first central axis of the tubular assembly, between the second pressing portion and the second elastic member in the first and second central axis directions.

According to this configuration, the first elastic member can be pressed uniformly by the first annular member and/or the second elastic member can be pressed uniformly by the second annular member. If the first annular member and the second annular member (hereinafter, they are simply referred to as annular members in some cases) are not provided, the pressing portion directly presses the elastic member, whereby an unintended deformation of the elastic member may be caused depending on the shape of the pressing portion. For example, in the case where the pressing portion has a shape that unevenly presses only a few locations of the surface of the elastic member, only the few unevenly pressed locations of the elastic member are unevenly deformed, and the tube body cannot be uniformly expanded. However, as in the configuration described above, when the elastic member is pressed via the annular member, a force can be uniformly applied to the elastic member over the circumferential direction of the central axis, and it is hence possible to prevent an unintended deformation of the elastic member and to stably perform joining by press-fitting.

At least one of the first pressing portion and the second pressing portion may be formed point-symmetrically about the first and second central axes in a cross section perpendicular to the first and second central axis directions.

According to this configuration, since the pressing portion is formed point-symmetrically as described above, it is easy to apply a force uniformly to the elastic member. That is, the possibility of causing an unintended deformation of the elastic member as described above can be reduced. The shape of the pressing portion may be, for example, a cross or other radiating shape in the cross section.

The motion mechanism may include a cam mechanism that converts a force acting in a direction other than the first and second central axis directions into a force in the first and second central axis directions.

According to this configuration, since the cam mechanism can convert the acting direction of the force, the arrangement of the tube body to be swaged and joined can be arbitrarily selected. For example, normally, a processing machine such as a press machine that applies a compression force applies a compression force in the vertical direction. The cam mechanism can convert a vertical force applied by a processing machine such as the normal press machine into a horizontal force, for instance. Accordingly, it is also possible to horizontally arrange the tube body to be swaged and joined while using a processing machine such as the normal press machine. Furthermore, when the tube body is a long member, it is possibly joined with the plurality of wall portions by press-fitting, and hence it is particularly effective that the joining by press-fitting can be simultaneously and accurately performed at a plurality of locations. However, when the tube body is a long member, since a limit stroke is defined in a facility such as the normal pressing machine that vertically applies a compression force, there is a possibility that the swaging and joining cannot be performed due to the limitation of dimensions. However, in the above configuration, since the cam mechanism can convert the acting direction of the force, the swaging and joining can be performed by selecting an arbitrary arrangement that is not affected by the limit stroke without being subjected to dimension restriction.

The motion mechanism may be a pressing mechanism that presses the shaft unit.

According to this configuration, the pressing mechanism presses the shaft unit to move it in the central axis direction with respect to the tubular unit, and the tube body and the wall portion can be simultaneously and accurately joined at a plurality of locations by press-fitting.

The motion mechanism may be a pulling mechanism that pulls the shaft unit.

According to this configuration, the pulling mechanism pulls the shaft unit to move it in the central axis direction with respect to the tubular unit, and the tube body and the wall portion can be simultaneously and accurately joined at a plurality of locations by press-fitting. In particular, in the case where the shaft unit is pulled to be swaged and joined, an unintended movement of the tube body and the wall portion can be suppressed more often than that in the case where the shaft unit is pressed to be swaged and joined, and it is hence possible to stably perform joining by press-fitting.

A member joining method according to the first aspect of the present invention includes:

providing a tube body, at least two wall portions provided with hole portions, and the member joining device;

inserting the tube body through the hole portions of at least the two wall portions;

inserting the member joining device inside the tube body; and compressing the first elastic member and the second elastic member in the first central axis direction by the member joining device to expand the elastic members radially outward, and thereby expanding and deforming at least two locations of the tube body to join the tube body to the hole portions of at least the two wall portions by press-fitting.

According to this method, as described above, since the position of the elastic member is not shifted at the time of swaging and joining, it is possible to simultaneously and accurately join the tube body and the wall portion at a plurality of locations by press-fitting.

A member joining device of a second aspect of the present invention includes:

a tubular unit that includes a tubular assembly that has a first central axis and can linearly move in the first central axis direction, and a first pressing portion and a second pressing portion whose positions in a first central axis direction are fixed with respect to the tubular assembly;

a shaft unit that includes a shaft assembly that is inserted into the tubular assembly and has a second central axis that extends in the same direction as the first central axis, and a first receiving portion and a second receiving portion whose positions in a second central axis direction are fixed with respect to the tubular assembly, wherein the first receiving portion and the second receiving portion are positioned radially outside the first central axis of the tubular assembly, the first receiving portion faces the first pressing portion in the first and second central axis directions, and the second receiving portion faces the second pressing portion in the first and second central axis directions;

a first elastic member arranged radially outside the first central axis of the tubular assembly, between the first pressing portion and the first receiving portion in the first and second central axis directions;

a second elastic member arranged radially outside the first central axis of the tubular assembly, between the second pressing portion and the second receiving portion in the first and second central axis directions; and a motion mechanism that moves the tubular unit in the first and second central axis directions with respect to the shaft unit.

According to this configuration, it is possible to simultaneously and accurately join the tube body and the wall portion at a plurality of locations by press-fitting in accordance with the following usage. First, the tube body is inserted into hole portions of a plurality of wall portions. Next, the member joining device is inserted inside the tube body. At this time, the first elastic member and the second elastic member (hereinafter, they are simply referred to as elastic members in some cases) are aligned with the hole portions of the respective wall portions in the first and second central axis directions (hereinafter they are simply referred to as central axes in some cases). Then, the motion mechanism moves the tubular unit in the central axis direction with respect to the shaft unit. In the above configuration, the first receiving portion and the second receiving portion (hereinafter they are simply referred to as receiving portions in some cases) are immovable in the central axis direction, and the first pressing portion and the second pressing portion (hereinafter they are simply referred to as pressing portions in some cases) are movable in the central axis direction. That is, movement of the tubular unit allows the pressing portion to approach the receiving portion, whereby the elastic member can be compressed in the central axis direction. With this compression, the elastic members are each expanded toward the radially outside the central axis, whereby the tube body is expanded, and the tube body is joined to the hole portion of the wall portion by press-fitting. Here, the radial direction of the central axis means the radial direction of the column when a column having the central axis is assumed.

In particular, in the above configuration, the tube body and the wall portion can be joined at a plurality of locations by press-fitting with the first elastic member, which is arranged between the first pressing portion and the first receiving portion, and the second elastic member, which is arranged between the second pressing portion and the second receiving portion. It is to be noted that the joining locations are not limited to two locations but may be three or more.

According to this configuration, since the positions of the first pressing portion and the second pressing portion in the central axis direction are fixed with respect to the tubular assembly, the first pressing portion and the second pressing portion move in synchronization with each other. Therefore, the joining at the plurality of locations by press-fitting can be performed simultaneously.

According to this configuration, since the elastic member is supported by the receiving portion, the position of the elastic member in the central axis direction does not change at the time of swaging and joining. Therefore, each of the plurality of elastic members can be deformed at an accurate position, and each portion of the tube body can be expanded at an accurate position. Accordingly, only a necessary portion of the tube body can be accurately expanded without expanding an unnecessary portion of the tube body, and hence the tube body can be accurately joined by press-fitting.

The tubular assembly is provided with a slit that extends in the first central axis direction, and at least one of the first receiving portion and the second receiving portion may penetrate the tubular assembly at the slit and protrude radially outside the first central axis of the tubular assembly.

According to this configuration, by providing the slit in the tubular assembly, at least one of the first receiving portion and the second receiving portion can protrude radially outside the central axis from the tubular assembly. Since the slit extends in the central axis direction, the tubular assembly can be configured to be linearly movable in the central axis direction outside the shaft assembly. That is, it is possible to easily realize the configuration that includes the first receiving portion and the second receiving portion, which are immovable in the central axis direction, and the first pressing portion and the second pressing portion, which are movable in the central axis direction.

The member joining device may further include at least one of a first annular member that is arranged radially outside the first central axis of the tubular assembly, between the first receiving portion and the first elastic member in the first and second central axis directions, and a second annular member that is arranged radially outside the first central axis of the tubular assembly, between the second receiving portion and the second elastic member in the first and second central axis directions.

According to this configuration, the first elastic member can be supported uniformly by the first annular member and the second elastic member can be supported uniformly by the second annular member. If the first annular member and the second annular member (hereinafter, they are simply referred to as annular members in some cases) are not provided, the receiving portion directly supports the elastic member, whereby an unintended deformation of the elastic member may be caused depending on the shape of the receiving portion. For example, in the case where the receiving portion has a shape that unevenly supports only a few locations of the surface of the elastic member, only the few unevenly supported locations of the elastic member are unevenly deformed, and the tube body cannot be uniformly expanded. However, as in the configuration described above, when the elastic member is supported through the annular member, a force can be uniformly applied to the elastic member over the circumferential direction of the central axis, and it is hence possible to prevent an unintended deformation of the elastic member and to stably perform joining by press-fitting.

At least one of the first receiving portion and the second receiving portion may be formed point-symmetrically about the first and second central axes in a cross section perpendicular to the first and second central axis directions.

According to this configuration, since the receiving portion is formed point-symmetrically as described above, it is easy to apply a force uniformly to the elastic member. That is, the possibility of causing an unintended deformation of the elastic member as described above can be reduced. The shape of the receiving portion may be, for example, a cross or other radiating shape in the cross section.

The motion mechanism may include a cam mechanism that converts a force acting in a direction other than the first and second central axis directions into a force in the first and second central axis directions.

According to this configuration, since the cam mechanism can convert the acting direction of the force, the arrangement of the tube body to be swaged and joined can be arbitrarily selected. For example, normally, a processing machine such as a press machine that applies a compression force applies a compression force in the vertical direction. The cam mechanism can convert a vertical force applied by a processing machine such as the normal press machine into a horizontal force, for instance. Accordingly, it is also possible to horizontally arrange the tube body to be swaged and joined while using a processing machine such as the normal press machine. Furthermore, when the tube body is a long member, it is possibly joined with the plurality of wall portions by press-fitting, and hence it is particularly effective that the joining can be simultaneously and accurately performed at a plurality of locations by press-fitting. However, when the tube body is a long member, since a limit stroke is defined in a facility such as the normal pressing machine that vertically applies a compression force, there is a possibility that the joining by press-fitting cannot be performed due to the limitation of dimensions. However, in the above configuration, since the cam mechanism can convert the acting direction of the force, the joining by press-fitting can be performed by selecting an arbitrary arrangement that is not affected by the limit stroke without being subjected to dimension restriction.

The motion mechanism may be a pressing mechanism that presses the tubular unit.

According to this configuration, the pressing mechanism presses the shaft unit to move it in the central axis direction with respect to the tubular unit, and the tube body and the wall portion can be simultaneously and accurately joined at a plurality of locations by press-fitting.

The motion mechanism may be a pulling mechanism that pulls the tubular unit.

According to this configuration, the pulling mechanism pulls the shaft unit to move it in the central axis direction with respect to the tubular unit, and the tube body and the wall portion can be simultaneously and accurately joined at a plurality of locations by press-fitting. In particular, in the case where the shaft unit is pulled to be swaged and joined, an unintended movement of the tube body and the wall portion can be suppressed more often than that in the case where the shaft unit is pressed to be swaged and joined, and it is hence possible to stably perform joining by press-fitting.

A member joining method according to the second aspect of the present invention includes:

providing a tube body, at least two wall portions provided with hole portions, and the member joining device;

inserting the tube body through the hole portions of at least the two wall portions;

inserting the member joining device into an inside of the tube body; and compressing the first elastic member and the second elastic member in the first central axis direction by the member joining device to expand the elastic members radially outside, and thereby expanding and deforming at least two locations of the tube body, to join the hole portions of at least the two wall portions by press-fitting.

According to this method, as described above, since the position of the elastic member is not shifted at the time of swaging and joining, it is possible to simultaneously and accurately join the tube body and the wall portion at a plurality of locations by press-fitting.

According to the present invention, in the member joining device and the member joining method, it is possible to simultaneously and accurately join the tube body and the wall portion at a plurality of locations by press-fitting.

BRIEF DESCRIPTION OF THE DRAWINGS

FIG. 17 is an exploded perspective view of a member joining device according to a fifth embodiment;

FIG. 18A is a partial sectional view of the member joining device according to the fifth embodiment before swaging and joining;

FIG. 20A is a partial sectional view of a modification of the member joining device according to the fifth embodiment before swaging and joining;

FIG. 21A is a partial sectional view of a member joining device according to a sixth embodiment before swaging and joining;

FIG. 23A is a partial sectional view of a first modification of the member joining device according to the sixth embodiment before swaging and joining;

MODE FOR CARRYING OUT THE INVENTION

Embodiments (first to third embodiments) of the first aspect of the present invention will be described below with reference to the accompanying drawings. In the following embodiments, the materials of a tube body 100 and a wall portion 200 are not particularly limited, and may be different materials or the same material.

First Embodiment

Figure 1:
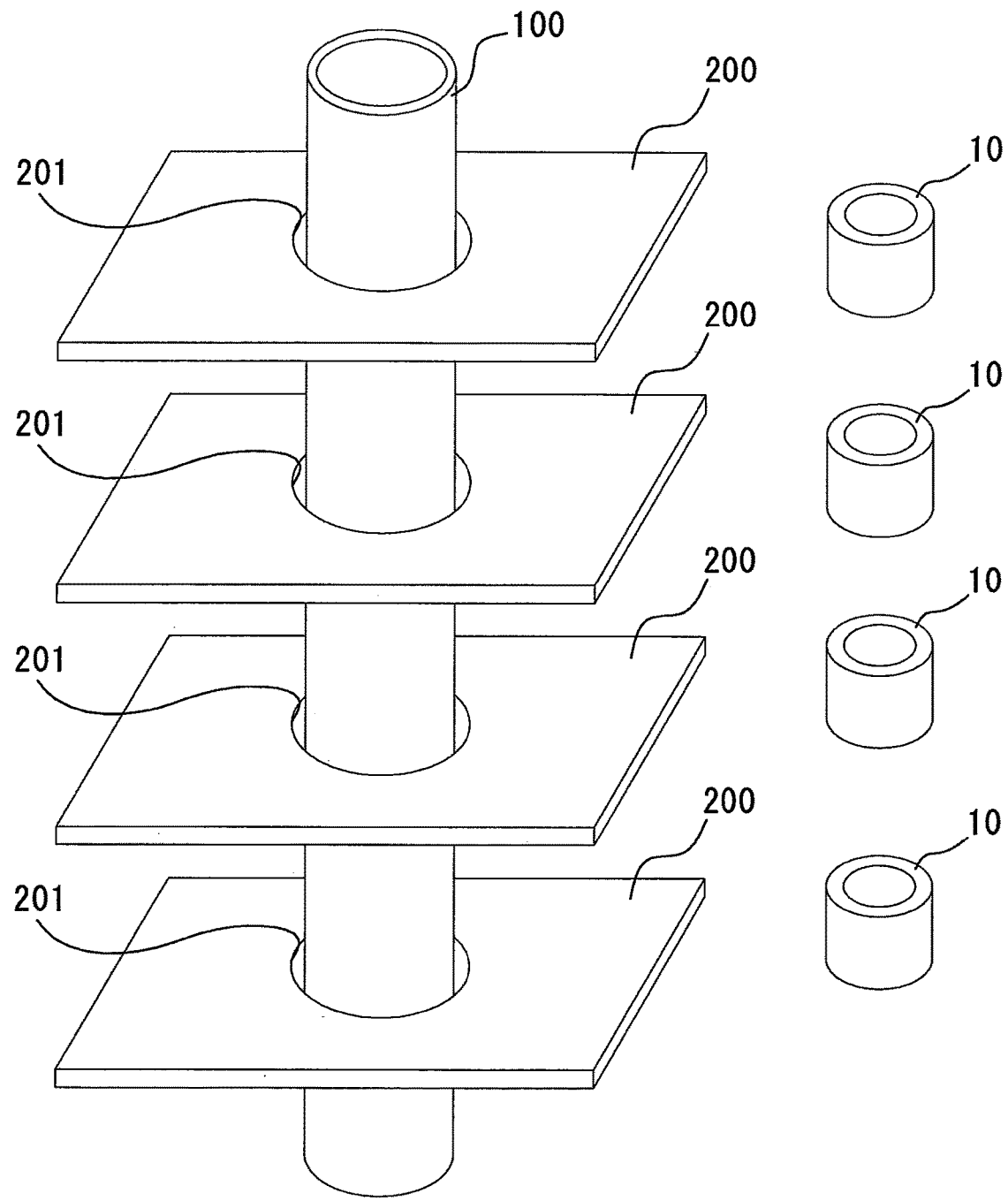
FIG. 1 is a perspective view showing a tube body, a wall portion, and a rubber member.

As shown in FIG. 1, in the present embodiment, one tube body 100 and four wall portions 200 are joined by press-fitting using four rubber members (elastic members) 10. The present embodiment is a conceptual example for facilitating understanding of the present invention. Therefore, a specific detailed configuration will be described in the second and subsequent embodiments.

As shown in FIG. 1, the tube body 100 is a circular tube and may be, for example, an aluminum pipe. The wall portion 200 is a plate-like body formed with a circular hole portion 201 through which the tube body 100 can be inserted, and may be a part of a component made of high-tension steel, for example. In the present embodiment, the one tube body 100 is inserted through the hole portions 201 of the four wall portions 200 of the same shape. The tube body 100 is expanded at four locations by the rubber member 10, and is joined to the wall portion 200 at the four locations by press-fitting.

Figure 2:
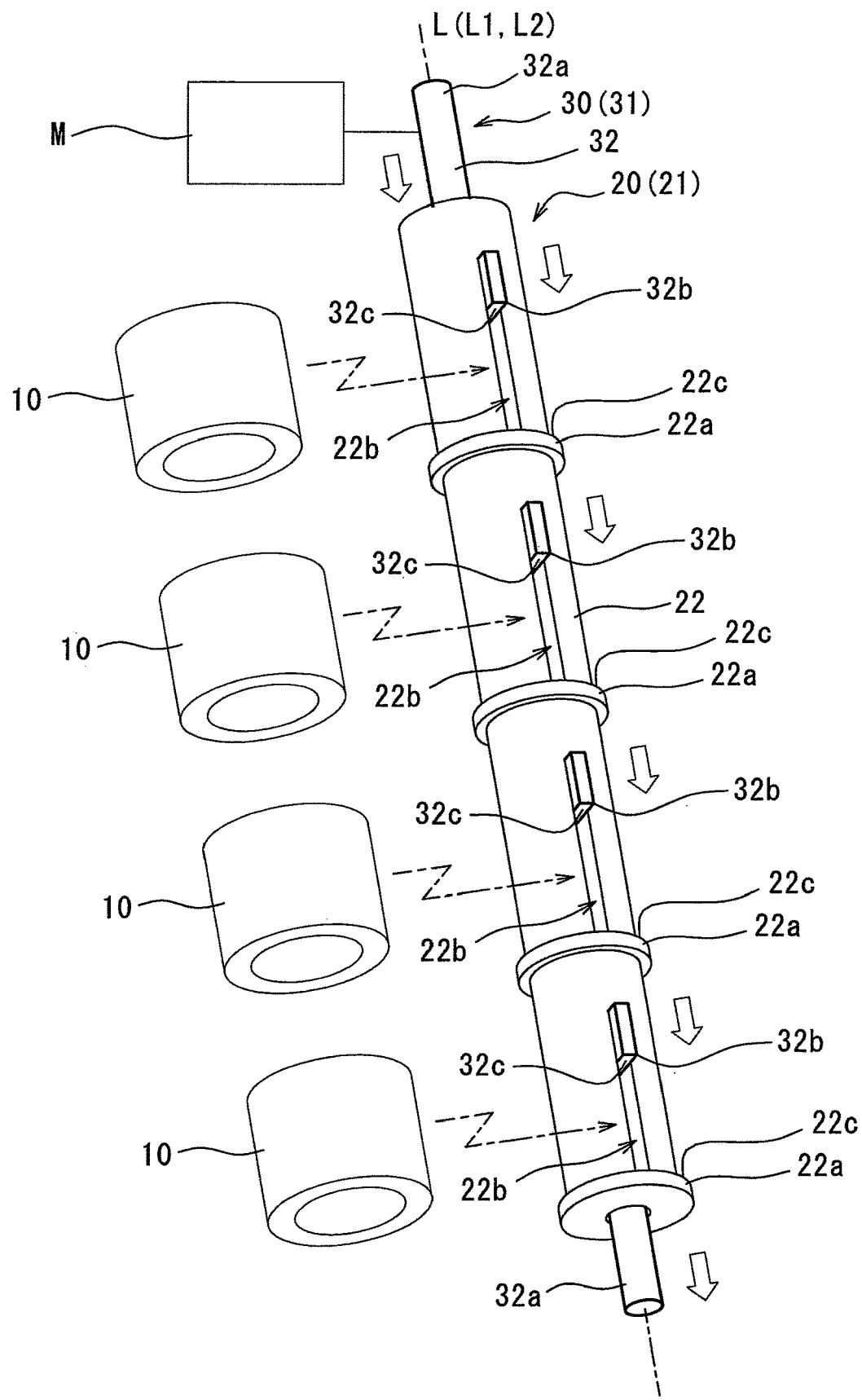
FIG. 2 is a perspective view of a member joining device according to a first embodiment of the present invention.

As shown in FIG. 2, a member joining device 1 of the present embodiment includes a tubular unit 20, a shaft unit 30, four rubber members 10, and a motion mechanism M that is conceptually illustrated. In FIG. 2, the member joining device 1 is shown with the rubber members 10 being separated for clarity of illustration, but is actually used with the rubber members 10 being combined as described later (see long dashed short dashed line with arrow in FIG. 2).

The tubular unit 20 of the present embodiment includes a tubular assembly 21 constituted by a single tubular member 22 and four flange portions (receiving portions) 22a. The tubular member 22 is a generally cylindrical member that extends in a first central axis L1 direction. An outer peripheral surface of the tubular member 22 is formed with the four flange portions (receiving portions) 22a. In other words, the positions of the four flange portions 22a in the direction of the first central axis L1 are fixed with respect to the tubular assembly 21. One of the four flange portions 22a is formed on the end surface of the tubular member 22. The outer shape of each of the four flange portions 22a is circular as viewed in the direction of the first central axis L1, and is large enough to allow the tubular member 22 to be inserted into the tube body 100. The flange portion 22a has a receiving surface 22c that is a flat surface perpendicular to the first central axis L1. The tubular member 22 is provided with four slits 22b that extend in the direction of the first central axis L1.

The shaft unit 30 of the present embodiment includes a shaft assembly 31 constituted by a single shaft member 32 and four protrusion portions (pressing portions) 32b. The shaft member 32 has a generally columnar shaft 32a that extends in the direction of a second central axis L2, and a protrusion portion (pressing portion) 32b that protrudes radially outside the second central axis L2 is formed on the shaft 32a. In other words, the position of the protrusion portion 32b in the second central axis L2 direction is fixed with respect to the shaft assembly 31. As shown in FIG. 2, when the shaft unit 30 and the tubular unit 20 are combined, the directions of the first central axis L1 and the second central axis L2 are aligned with each other. Therefore, in the state where the shaft unit 30 and the tubular unit 20 are combined, the first central axis L1 and the second central axis L2 may be collectively referred to as the central axis L. Each of the protrusion portions 32b protrudes from the shaft 32a in two directions, and more specifically, is formed into an I-shape as viewed from the second central axis L2. The shaft 32a of the shaft member 32 is smaller than the inner diameter of the tubular member 22 in the radial direction, and the protrusion portion 32b is larger than the outer diameter of the tubular member 22. The shaft member 32 can be inserted into the tubular member 22, and in the inserted state, the protrusion portion 32b penetrates the tubular member 22 through the slit 22b of the tubular member 22 and protrudes radially outside the tubular member 22. Therefore, the shaft member 32 can linearly move in the central axis L direction partially inside and outside the tubular member 22. The protrusion portion 32b has a pushing surface 32c that is a flat surface perpendicular to the second central axis L2. The pushing surface 32c faces the receiving surface 22c of the flange portion 22a in the central axis L direction. Accordingly, the distance between the pushing surface 32c and the receiving surface 22c changes due to the above-described linear motion.

The four rubber members 10 have a cylindrical shape with both end surfaces being flat surfaces, and are all the same. The rubber member 10 is preferably made of, for example, any of urethane rubber, chloroprene rubber, CNR rubber (chloroprene rubber and nitrile rubber), and silicon rubber. The hardness of the rubber member 10 is preferably 30 or more in Shore A.

The member joining device 1 is configured by the tubular unit 20 being inserted into the shaft unit 30 and the rubber members 10 are respectively arranged radially outside the tubular member 22 between the flange portion 22a and the protrusion portion 32b.

Figure 3:
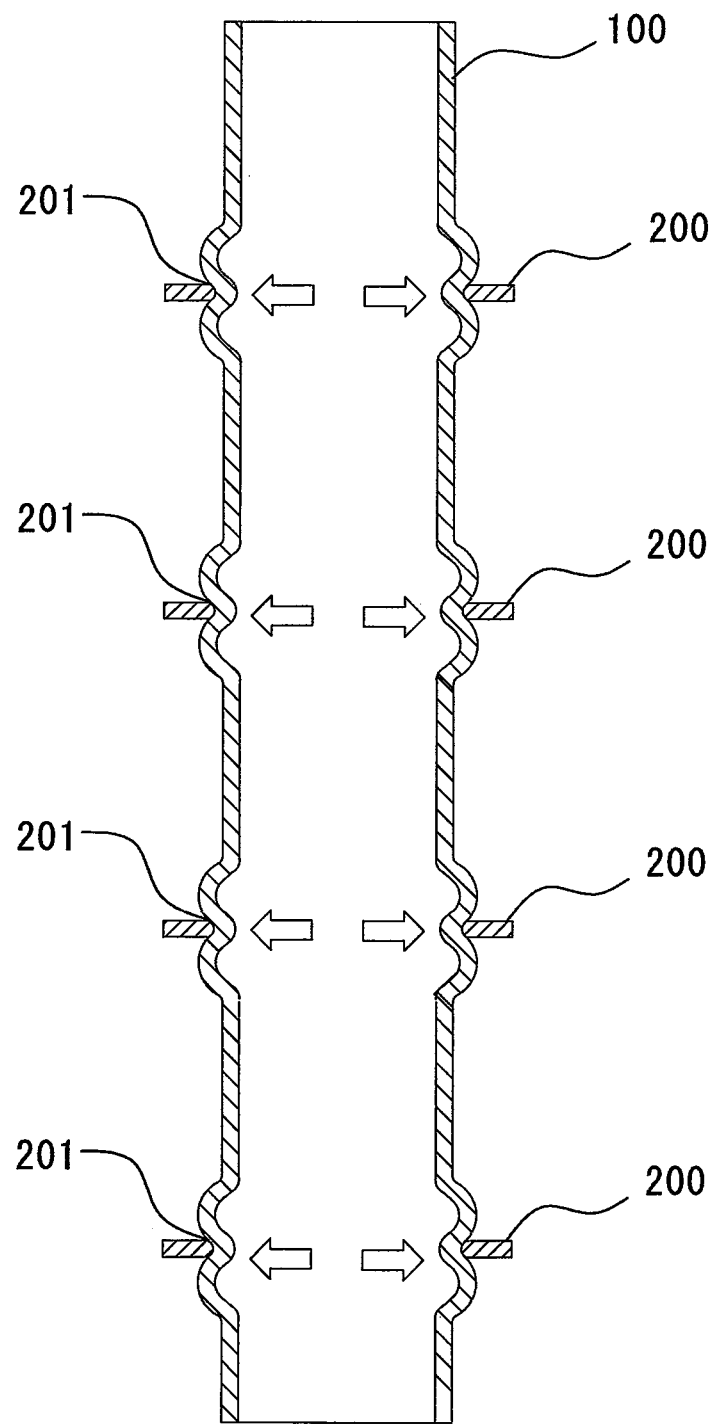
FIG. 3 is a sectional view of the tube body and the wall portion after joining.

When swaging and joining, as shown in FIG. 1, the tube body 100 is first inserted into the hole portions 201 of the four wall portions 200. Next, the member joining device 1 shown in FIG. 2 is inserted inside the tube body 100 in a combined state. At this time, each of the rubber members 10 is aligned with the hole portion 201 of the wall portion 200 in the central axis L direction to fix the tubular unit 20. After that, the motion mechanism M moves the shaft unit 30 in the central axis L direction with respect to the tubular unit 20 (see the arrow in FIG. 2). This narrows the space between the receiving surface 22c of the flange portion 22a and the pushing surface 32c of the protrusion portion 32b, and the pushing surface 32c and the receiving surface 22c compress the rubber members 10 in the central axis L direction. With this compression, each of the rubber members 10 is expanded toward the radially outside the central axis L, and as shown in FIG. 3, each portion of the tube body 100 is expanded by the rubber member 10, and the tube body 100 is joined to the hole portion 201 of the wall portion 200 by press-fitting. The present invention is a conceptual example as mentioned earlier, and in practice, it is preferable to perform swaging and joining by increasing the area of the pushing surface 32c or using a member such as an annular indenter 40 (see FIG. 5 and the like) of the second embodiment and subsequent embodiments.

According to the present embodiment, the tube body 100 and the wall portion 200 can be simultaneously and accurately joined at four locations by press-fitting.

In the configuration of the present embodiment, the tube body 100 and the wall portion 200 can be joined at four locations by press-fitting with the four rubber members 10 arranged between the flange portion 22a and the protrusion portion 32b.

According to the present embodiment, since the position of each of the protrusion portions 32b in the central axis L direction is fixed with respect to the shaft assembly 31, the protrusion portions 32b move in synchronization with one another. Therefore, the joining at these four locations by press-fitting can be performed simultaneously.

According to the present embodiment, since the rubber member 10 is supported by the flange portion 22a in the central axis L direction, the position of the rubber member 10 in the central axis L direction does not change at the time of swaging and joining. Therefore, each of the rubber members 10 can be deformed at the accurate position, and each portion of the tube body 100 can be expanded at the accurate position. Accordingly, only a necessary portion of the tube body 100 can be accurately expanded without expanding an unnecessary portion of the tube body, and hence the tube body can be accurately joined by press-fitting.

According to the present embodiment, by providing the slit 22b in the tubular member 22, the protrusion portion 32b can protrude radially outside the central axis L from the tubular member 22. Since the slit 22b extends in the central axis L direction and the protrusion portion 32b is arranged to be linearly movable in the slit 22b, the shaft member 32 can be configured to be linearly movable in the central axis L direction inside the tubular member 22. That is, it is possible to easily realize the configuration that includes the flange portion 22a, which is immovable in the central axis L direction, and the protrusion portion 32b, which is movable in the central axis L direction.

Second Embodiment

With reference to FIGS. 4 to 7B, the member joining device 1 of the present embodiment is substantially the same as that of the first embodiment except for a detailed configuration. Accordingly, the same components as those in the configuration shown in the first embodiment are denoted by the same reference numerals and the description thereof may be omitted.

Figure 4:
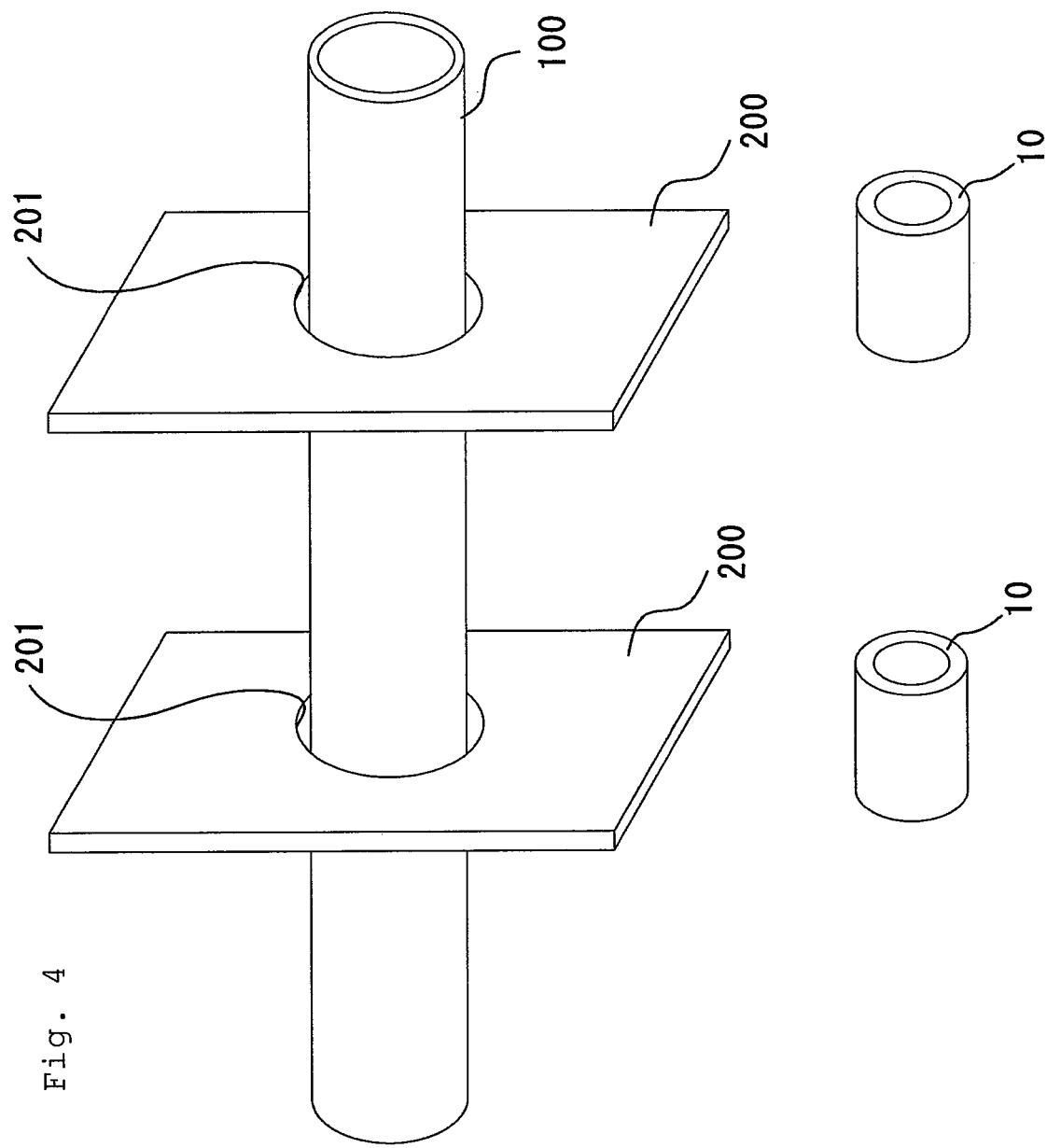
FIG. 4 is a perspective view showing the tube body, the wall portion, and the rubber member.

As shown in FIG. 4, in the present embodiment, the one tube body 100 and the two wall portions 200 are joined by press-fitting with the two rubber members 10. In particular, the tube body 100 is preferably arranged so as to horizontally extend from the viewpoint of ease of handling.

Figure 5:
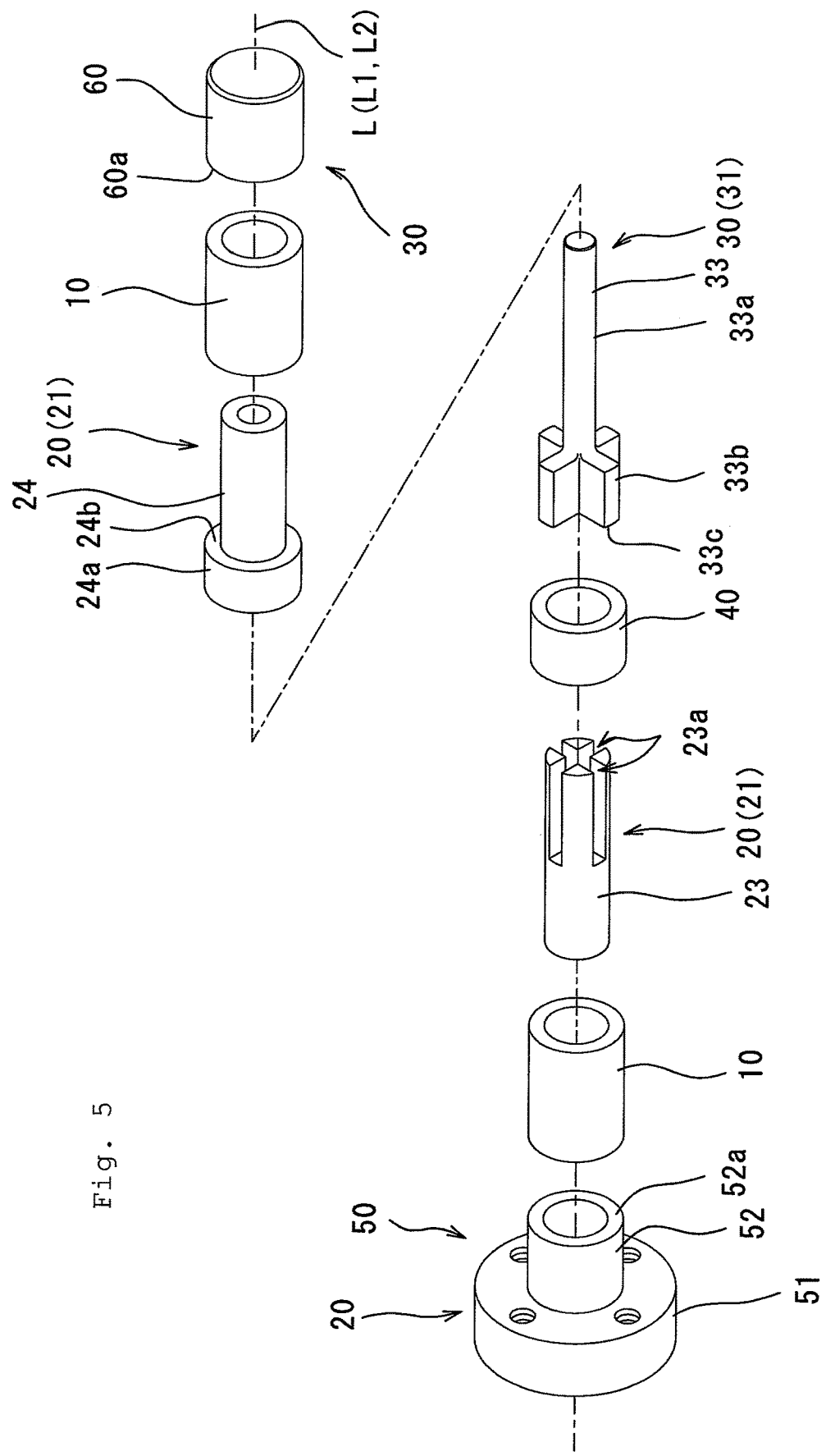
FIG. 5 is an exploded perspective view of a member joining device according to a second embodiment.

As shown in FIG. 5, the member joining device 1 of the present embodiment includes the tubular unit 20, the shaft unit 30, the rubber member 10, and the annular indenter (annular member) 40.

The tubular unit 20 of the present embodiment includes the tubular assembly 21 constituted by a first tubular member 23 and a second tubular member 24, a flange portion 24a (receiving portion), and a base portion 51 (receiving portion), which is a part of a fixing base 50. The first tubular member 23 is a generally cylindrical member that extends in the first central axis L1 direction. One end portion of the first tubular member 23 is formed with four slits 23a. The four slits 23a are formed at equal intervals in the circumferential direction of the first tubular member 23 and extend in the first central axis L1 direction. The second tubular member 24 is also a generally cylindrical member that extends in the first central axis L1 direction. One end portion of the second tubular member 24 is formed with the flange portion 24a. In other words, the position of the flange portion 24a in the first central axis L1 direction is fixed with respect to the tubular assembly 21. The outer diameter of the flange portion 24a is circular as viewed from the first central axis L1 direction. The flange portion 24a has a receiving surface 24b that is a flat surface perpendicular to the first central axis L1 direction. One end surface of the second tubular member 24 is provided with a counterbore hole 24c (see FIGS. 6A and 6B), which is concave in the first central axis L1 direction. The counterbore hole 24c (see FIGS. 6A and 6B) is circular as viewed in the first central axis L1 direction, and is large enough to partially receive one end portion of the first tubular member 23.

The shaft unit 30 of the present embodiment includes the shaft assembly 31 constituted by a single shaft member 33, a protrusion portion (pressing portion) 33b, and a plunger (pressing portion) 60. The shaft member 33 has a columnar shaft 33a that extends in the second central axis L2 direction, and the protrusion portion 33b that protrudes in four directions radially outside the second central axis L2. In other words, the position of the protrusion portion 33b in the second central axis L1 direction is fixed with respect to the shaft assembly 31. The protrusion portions 33b are formed at equal intervals in the circumferential direction of the shaft 33a, that is, they are formed in a cross shape as viewed from the second central axis L2 direction. The shaft 33a has a shape capable of being inserted into the second tubular member 24, and the protrusion portion 33b has a shape capable of being inserted into the slit 23a of the first tubular member 23. Therefore, the shaft member 33 can linearly move in the central axis L direction partially inside and outside the first tubular member 23. The protrusion portion 33b has a pushing surface 33c that is a flat surface perpendicular to the second central axis L2. The pushing surface 33c faces a receiving surface 52a of a standing hole portion 52 of the fixing base 50 in the central axis L direction. Accordingly, the distance between the pushing surface 33c and the receiving surface 52a changes due to the above-described linear motion.

The two rubber members 10 of the present embodiment are substantially the same as those of the first embodiment, and are both cylindrical.

The annular indenter 40 of the present embodiment is a cylindrical member with both end surfaces being flat surfaces. The annular indenter 40 has a shape capable of being arranged around the first tubular member 23, that is, the first tubular member 23 can be inserted into the annular indenter 40. The material of the annular indenter 40 is not particularly limited, but is preferably a material that does not deform due to the pressing force generated at the time of swaging and joining, and may be, for example, steel.

The fixing base 50 includes the columnar base portion 51 and a bottomed cylindrical standing hole portion 52 that rises from the center of the base portion 51 in the second central axis L2 direction. The base portion 51 is fixed with bolts to a fixing surface such as a floor surface or a wall surface not shown. The standing hole portion 52 is large enough to partially receive the first tubular member 23 and has the receiving surface 52a that is a flat surface perpendicular to the second central axis L2.

The plunger 60 has a bottomed cylindrical shape. The plunger 60 has a pushing surface 60a that is a flat surface perpendicular to the central axis L. The pushing surface 60a faces the receiving surface 24b of the flange portion 24a in the central axis L direction.

Figure 6A:
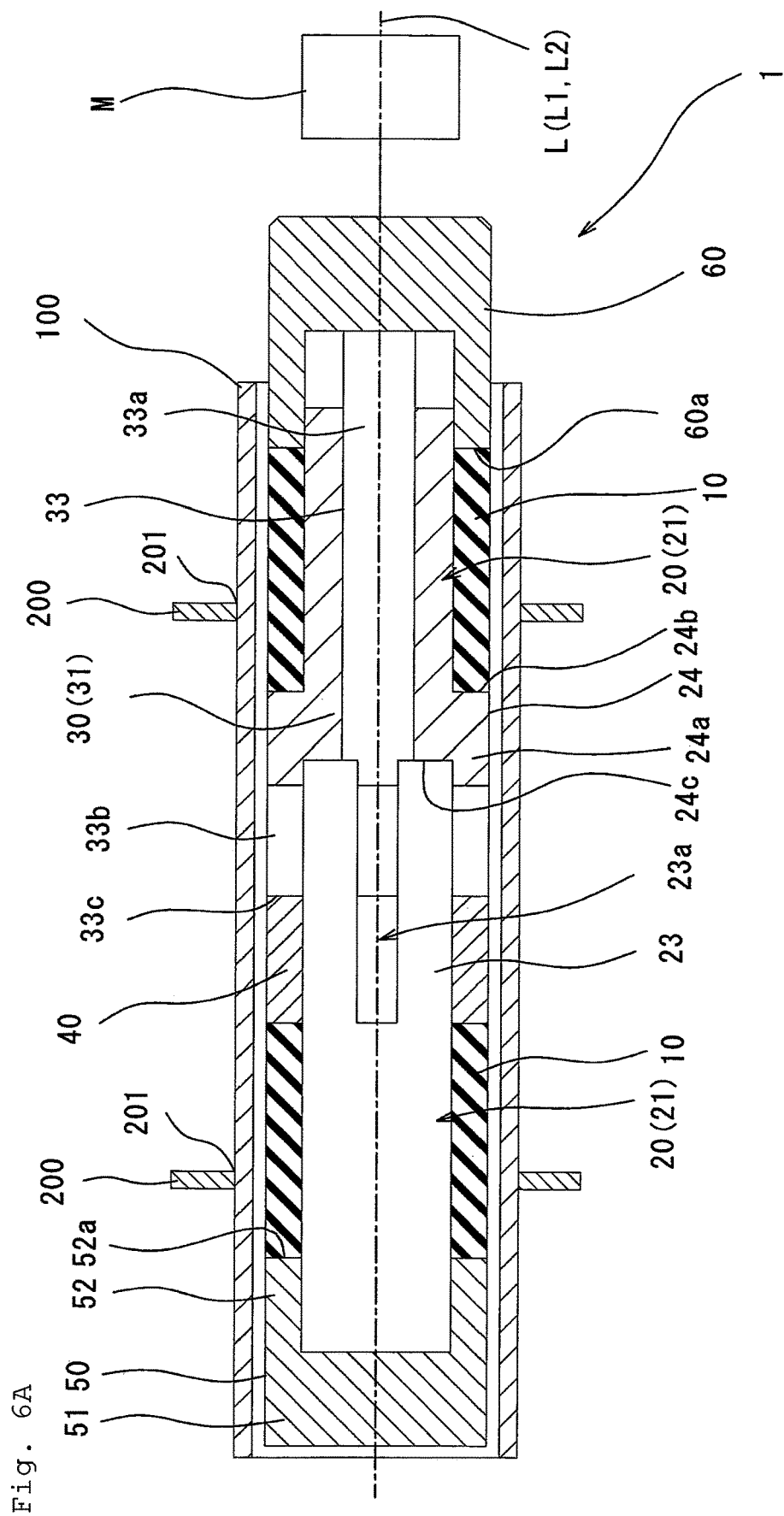
FIG. 6A is a partial sectional view of the member joining device according to the second embodiment before swaging and joining.

As shown in FIG. 6A, when these components are assembled, the first tubular member 23 is inserted into the fixing base 50 with the fixing base 50 fixed, the rubber member 10 is arranged around the first tubular member 23, and subsequently the annular indenter 40 is arranged around the first tubular member 23. The protrusion portion 33b of the shaft member 33 is inserted into the slit 23a of the first tubular member 23, the second tubular member 24 is arranged around the shaft member 33, and the rubber member 10 is arranged around the second tubular member 24. In this state, the end portion of the shaft member 33 protrudes from the second tubular member 24 and the rubber member 10. The plunger 60 is arranged on the shaft member 33 so as to cover the protruding shaft member 33. In the assembled member joining device 1, the shaft member 33 is arranged radially inside the central axis L, the first tubular member 23 and the second tubular member 24 are arranged in the middle, and the annular indenter 40 and the rubber member 10 are arranged outside. That is, the member joining device 1 has a three-layer structure. In the central axis L direction, particularly the direction toward the fixing base 50, the tubular unit 20 is immovable, and the shaft unit 30, the annular indenter 40, and the plunger 60 are movable.

In swaging and joining, first, the tube body 100 is inserted into the hole portion 201 of the wall portion 200. Next, the member joining device 1 is inserted inside the tube body 100. At this time, each of the rubber members 10 is aligned with the hole portion 201 of the wall portion 200 in the central axis L direction to fix the fixing base 50, that is, to fix the tubular unit 20.

Figure 6B:
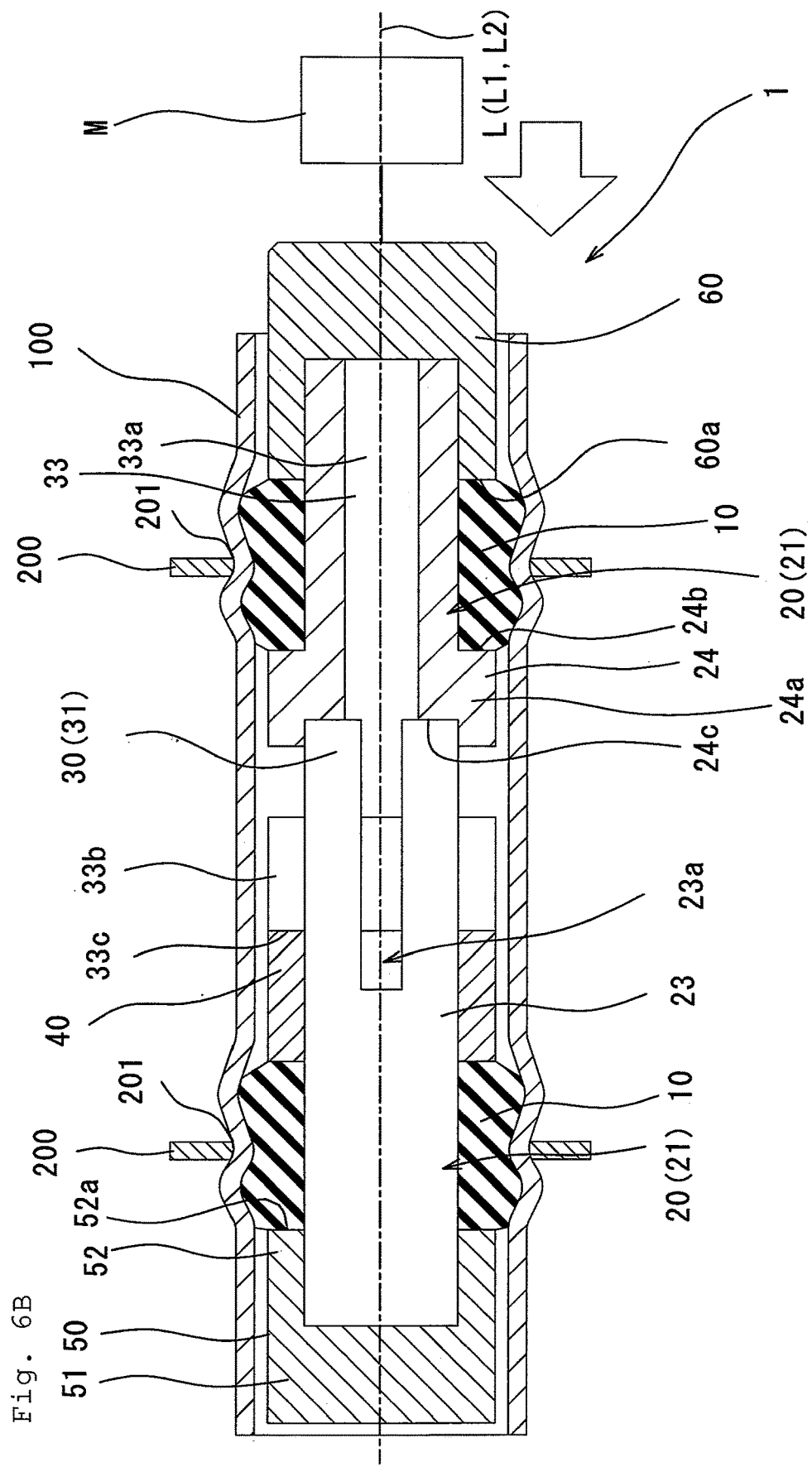
FIG. 6B is a partial sectional view of the member joining device according to the second embodiment after swaging and joining.

As shown in FIG. 6B, when the conceptually shown motion mechanism M moves the plunger 60 toward the fixing base 50 in the central axis L direction after the alignment, the shaft member 33 is pressed by the plunger 60 and moves, and the annular indenter 40 is pressed by the shaft member 33 and moves. Therefore, the space between the pushing surface 60a of the plunger 60 and the receiving surface 24b of the flange portion 24a of the second tubular member 24 is narrowed, and the rubber member 10 is compressed in the central axis L direction. At the same time, the space between the end surface of the annular indenter 40 and the receiving surface 52a of the standing hole portion 52 of the fixing base 50 is narrowed, and the rubber member 10 is compressed in the central axis L direction. With this compression, the rubber members 10 are each expanded toward the radially outside the central axis L, whereby the tube body 100 is expanded, and the tube body 100 is joined to the hole portion 201 of the wall portion 200 by press-fitting.

According to the present embodiment, the tube body 100 and the wall portion 200 can be simultaneously and accurately joined at two locations by press-fitting.

In the configuration of the present embodiment, the tube body 100 and the wall portion 200 can be joined at two locations by press-fitting with the rubber member 10 arranged between the plunger 60 and the flange portion 24a of the second tubular member 24, and the rubber member 10 arranged between the annular indenter 40 and the base portion 51 of the fixing base 50.

According to the present embodiment, since the positions of the plunger 60 and the protrusion portion 33b in the central axis L direction are fixed with respect to the shaft assembly 31, the plunger 60 and the protrusion portion 33b move in synchronization with each other. Therefore, the joining at these two locations by press-fitting can be performed simultaneously.

According to the present embodiment, since the rubber member 10 is supported by the receiving surface 52a of the fixing base 50 and the rubber member 10 is supported by the receiving surface 24b of the flange portion 24a of the second tubular member 24, the positions of the two rubber members 10 in the central axis L direction do not change even at the time of swaging and joining. Therefore, each of the two rubber members 10 can be deformed at the accurate position, and each portion of the tube body 100 can be expanded at the accurate position. Accordingly, only a necessary portion of the tube body 100 can be accurately expanded without expanding an unnecessary portion of the tube body, and hence the tube body can be accurately joined by press-fitting.

According to the present embodiment, by providing the slit 23a in the first tubular member 23, the protrusion portion 33b can protrude radially outside the central axis L from the first tubular member 23. Since the slit 23a extends in the central axis L direction and the protrusion portion 33b is arranged to be linearly movable in the slit 23a, the shaft member 33 can be configured to be linearly movable in the central axis L direction inside the tubular assembly 21. That is, it is possible to easily realize the configuration that includes the flange portion 24a and the fixing base 50, which are immovable in the central axis L direction, and the protrusion portion 33b and the plunger 60, which are movable in the central axis L direction.

According to the present embodiment, the rubber member 10 can be pressed uniformly by the plunger 60 and the rubber member 10 can be pressed uniformly by the annular indenter 40. If the annular indenter 40 is not provided, the protrusion portion 33b directly presses the rubber member 10, whereby since the shape of the protrusion portion 33b is a cross shaped, an unintended deformation of the rubber member 10 may be caused. Specifically, since the protrusion portion 33b has a shape that unevenly presses only a few locations of the surface of the rubber member 10, only the few unevenly pressed locations of the rubber member 10 may be unevenly deformed, and the tube body 100 may not be uniformly expanded. However, as in the configuration of the present embodiment, when the rubber member 10 is pressed through the annular indenter 40, a force can be uniformly applied to the rubber member 10 over the circumferential direction of the central axis L, and it is hence possible to prevent an unintended deformation of the rubber member 10 and to stably perform joining by press-fitting.

According to the present embodiment, the protrusion portion 33b is formed point-symmetrically about the central axis L in a cross section perpendicular to the central axis L of the shaft member 33, and more specifically, is formed in a cross shape. Such a point-symmetric formation makes it easy to apply a force uniformly to the rubber member 10. That is, the possibility of causing an unintended deformation of the rubber member 10 as described above can be reduced.

Figure 7A:
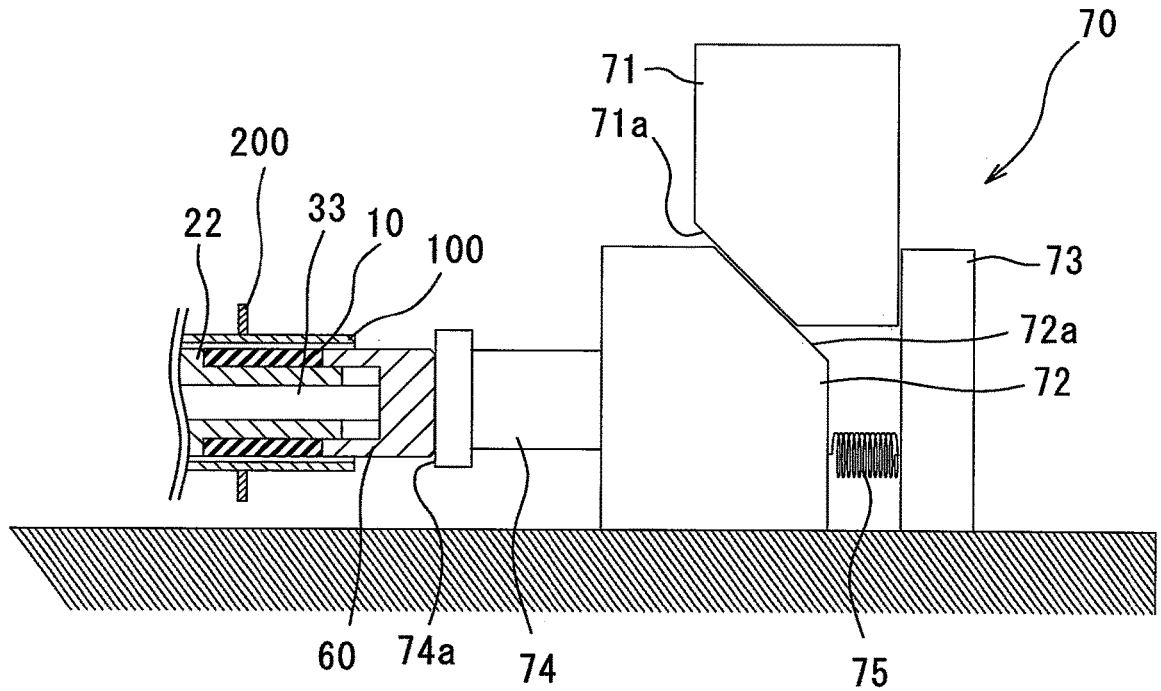
FIG. 7A is a side view of a motion mechanism before pressing.
Figure 7B:
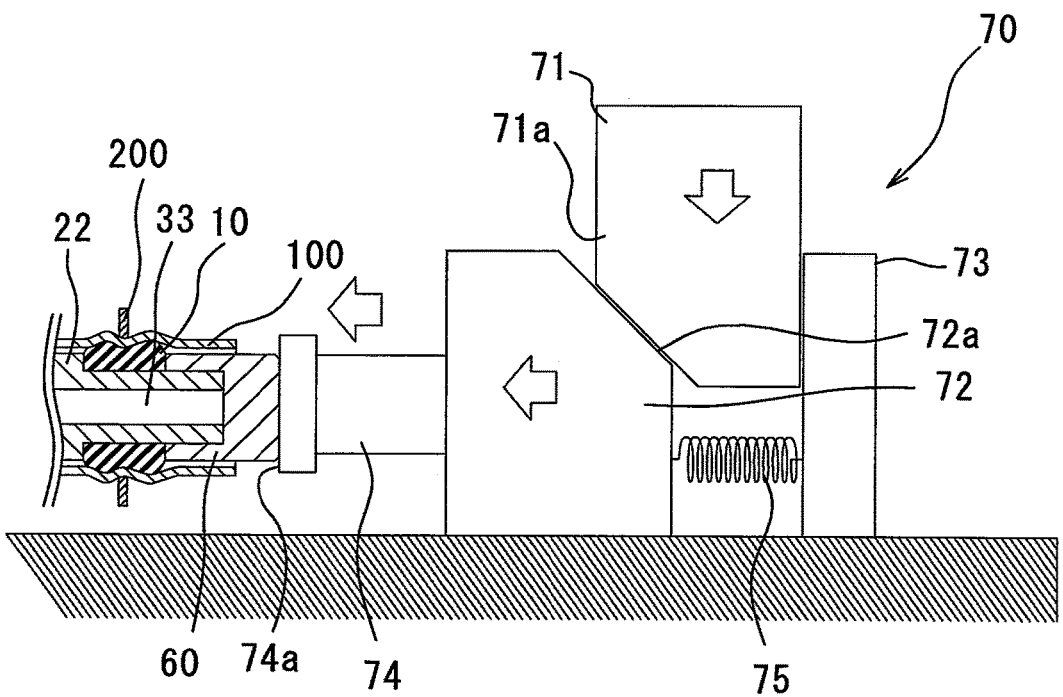
FIG. 7B is a side view of the motion mechanism after pressing.

FIGS. 7A and 7B show a pressing mechanism 70, which is an example of the motion mechanism M (see FIGS. 6A and 6B). The pressing mechanism 70 includes a cam driver 71, a cam slider 72, a standing wall portion 73, and a cylindrical extrusion base 74. The cam driver 71 is arranged adjacent to the vertically upright standing wall portion 73 fixed to the floor surface, and is movable vertically along the standing wall portion 73. The cam driver 71 has an inclined surface 71a at its lower portion for transmitting a force to the cam slider 72. For the cam driver 71, a press machine or the like that is usually used for pressing or the like may be used. The cam slider 72 has a rail mechanism (not shown) on its lower surface and is movable horizontally. However, other than the rail mechanism, it is possible to adopt any mechanism such as a wheel that reduces the frictional force with the ground when moving. The cam slider 72 has an inclined surface 72a on its upper portion for receiving a force from the cam driver 71. Therefore, the inclined surface 71a of the cam driver 71 and the inclined surface 72a of the cam slider 72 are formed so as to be inclined with respect to each other. The extrusion base 74 extends horizontally and has a flat pressing surface 74a for pressing the plunger 60. The extrusion base 74 is attached to the cam slider 72 and moves horizontally together with the cam slider 72.

When a vertical force (downward in the figure) is applied to the cam driver 71, the force is transmitted from the cam driver 71 to the cam slider 72 via the inclined surfaces 71a and 72a. As a result, the cam driver 71 moves vertically (downward in the figure) and the cam slider 72 moves horizontally (leftward in the figure). When the cam slider 72 moves, the extrusion base 74 also moves together and presses the plunger 60. The cam driver 71 and the cam slider 72 are an example of a cam mechanism.

The standing wall portion 73 and the cam slider 72 are elastically connected to each other via a coil spring 75. Accordingly, the cam slider 72 is biased toward the standing wall portion 73.

According to this pressing mechanism 70, since the cam mechanism can convert the acting direction of the force, the arrangement of the tube body 100 to be joined by press-fitting can be arbitrarily selected. For example, normally, a processing machine such as a press machine that applies a compression force applies a compression force in the vertical direction. The cam mechanism can convert a vertical force applied by a processing machine such as the normal press machine into a horizontal force, for instance. Accordingly, it is also possible to horizontally arrange the tube body 100 to be swaged and joined while using a processing machine such as the normal press machine. Furthermore, when the tube body 100 is a long member, it is possibly joined with the plurality of wall portions 200 by press-fitting, and hence it is particularly effective that the swaging and joining can be simultaneously and accurately performed at a plurality of locations. However, when the tube body 100 is a long member, since a limit stroke is defined in a facility such as the normal pressing machine that vertically applies a compression force, there is a possibility that the swaging and joining cannot be performed due to the limitation of dimensions. However, in the above configuration, since the cam mechanism can convert the acting direction of the force, the swaging and joining can be performed by selecting an arbitrary arrangement that is not affected by the limit stroke without being subjected to dimension restriction.

Figure 8A:
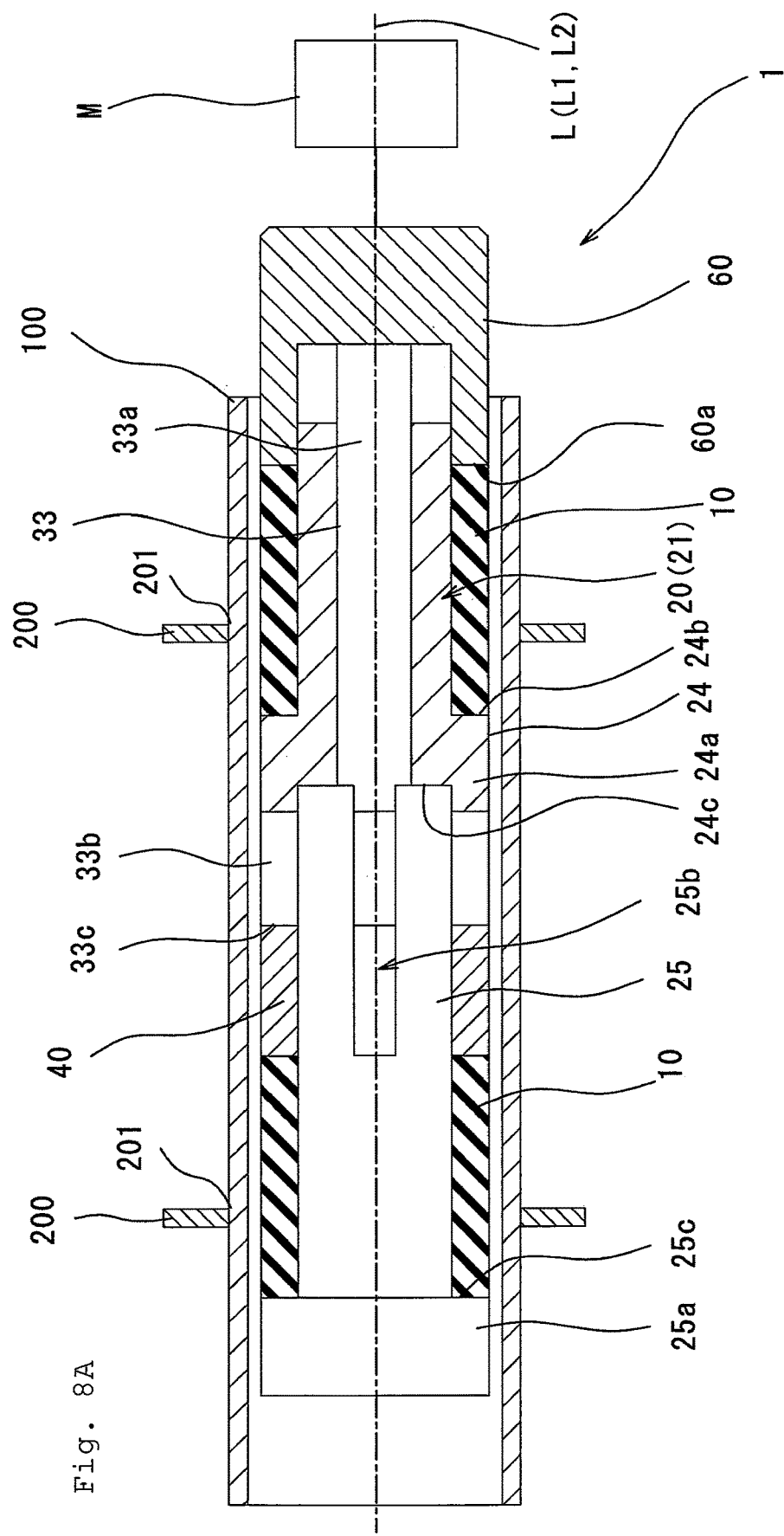
FIG. 8A is a partial sectional view of a first modification of the member joining device according to the second embodiment before swaging and joining.
Figure 8B:
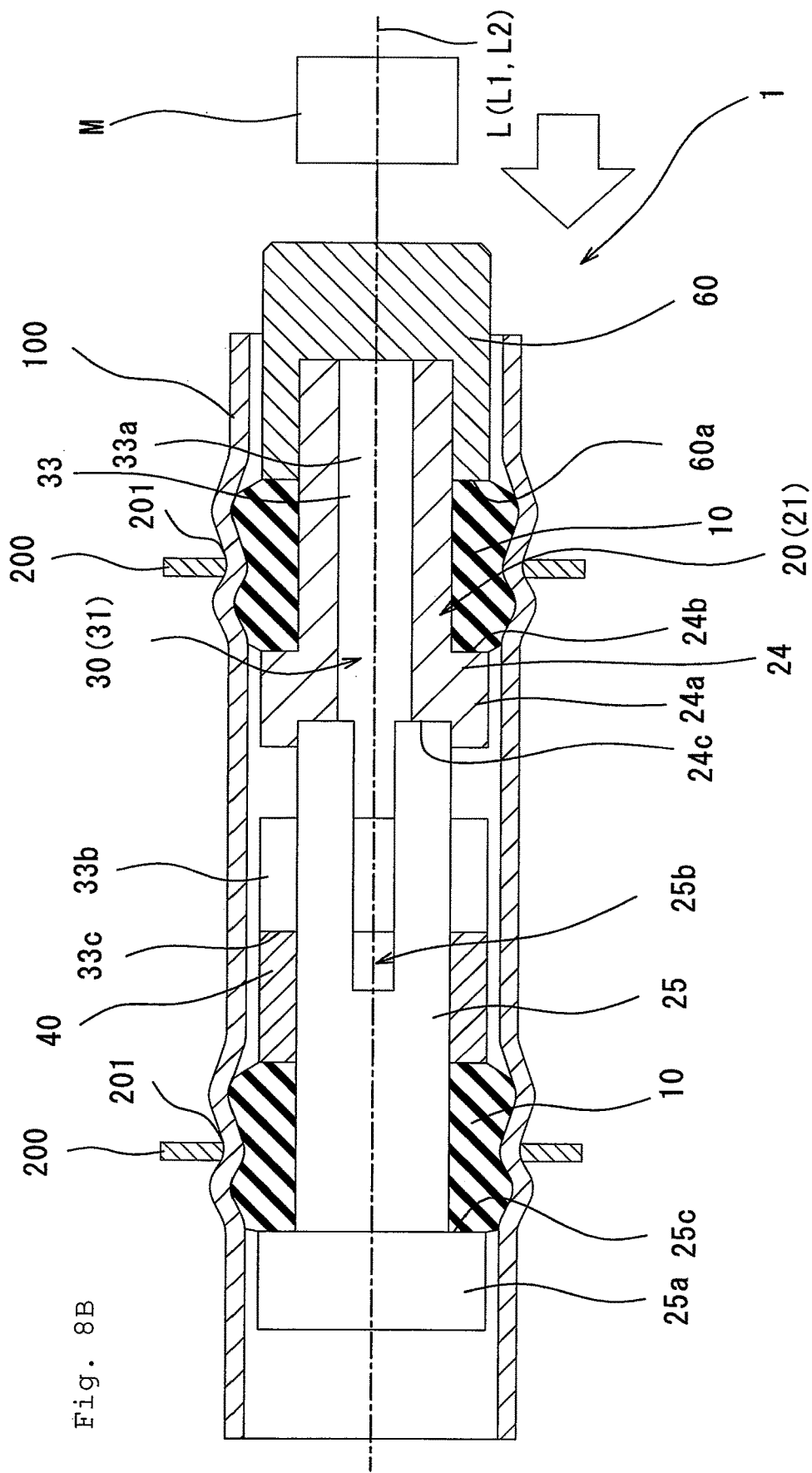
FIG. 8B is a partial sectional view of the first modification of the member joining device according to the second embodiment after swaging and joining.

As shown in FIGS. 8A and 8B, as the first modification of the present embodiment, a third tubular member 25 in which the first tubular member 23 and the fixing base 50 shown in FIGS. 6A and 6B are integrated may be used. Specifically, the third tubular member 25 includes a flange portion 25a that has a receiving surface 25c corresponding to the receiving surface 52a of the fixing base 50, and a slit 25b corresponding to the slit 23a of the first tubular member 23.

According to the present modification, joining by press-fitting can be performed without providing the fixing base 50 (see FIGS. 6A and 6B). Accordingly, the number of components can be reduced, and the cost can be reduced. In the present modification, the position of the third tubular member 25 is fixed instead of the fixing base 50 (see FIGS. 6A and 6B).

Figure 9A:
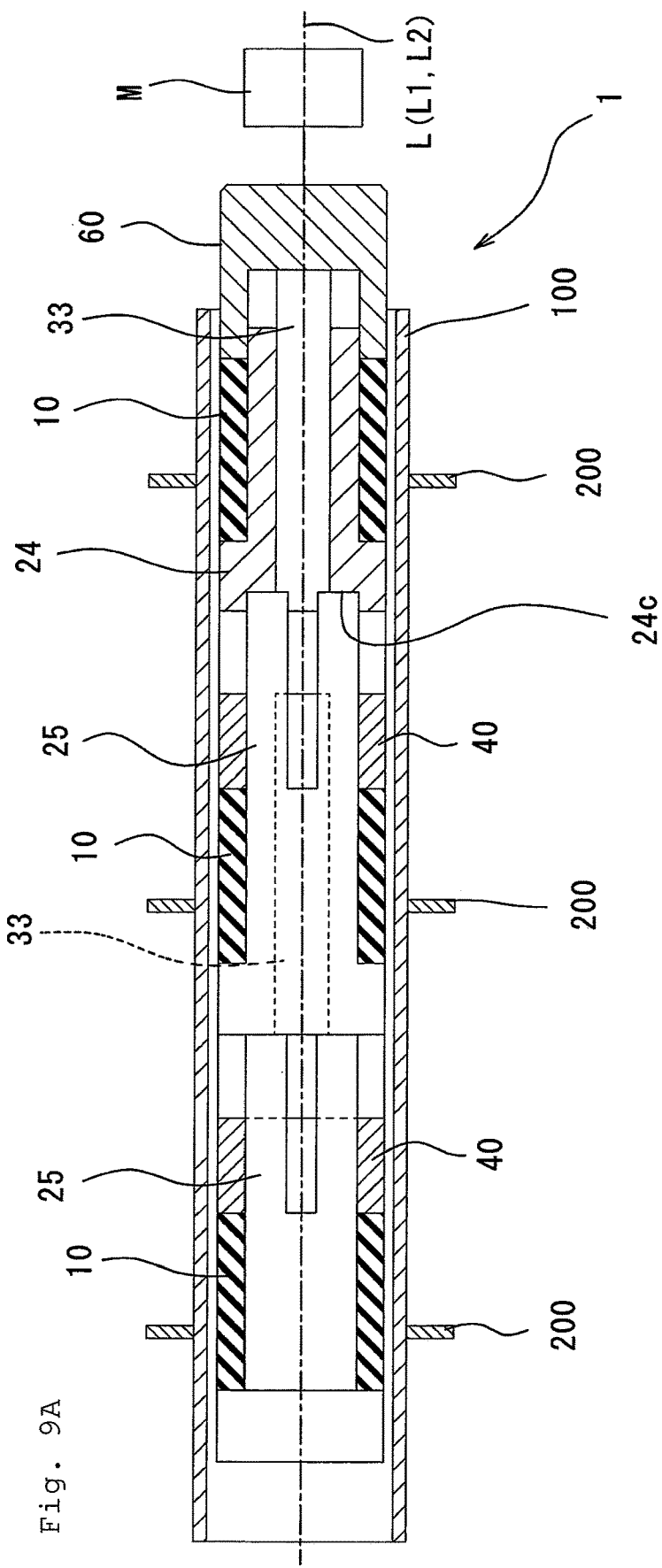
FIG. 9A is a partial sectional view of a second modification of the member joining device according to the second embodiment before swaging and joining.
Figure 9B:
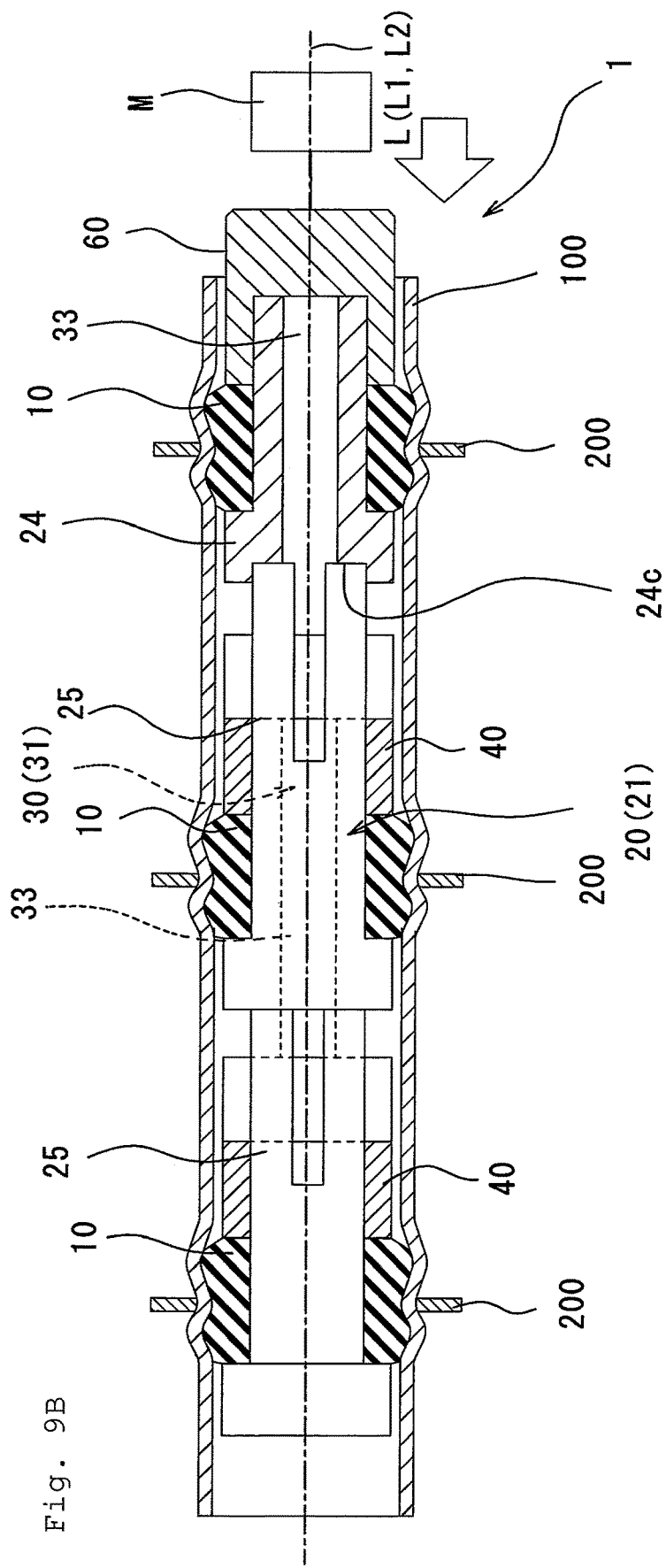
FIG. 9B is a partial sectional view of the second modification of the member joining device according to the second embodiment after swaging and joining.

As shown in FIGS. 9A and 9B, in the second modification of the present embodiment, three or more joint locations may be provided. The number of joint locations can be increased by continuously assembling the shaft member 33, the third tubular member 25, the annular indenter 40, and the rubber member 10 in addition to the configuration of the first modification described above. At this time, it is preferable that the third tubular member 25 includes a counterbore hole (not shown) for connection similar to the counterbore hole 24c of the second tubular member 24.

According to the present modification, three or more locations can be joined at one time. That is, by increasing the continuous configuration of the assembly, it is possible to arbitrarily increase the number of locations that can be joined at one time.

Third Embodiment

With reference to FIGS. 10A to 11B, the member joining device 1 of the present embodiment is substantially the same as that of the second modification of the second embodiment except for a detailed configuration. Accordingly, the same components as those in the configuration shown in the second modification of the second embodiment are denoted by the same reference numerals and the description thereof may be omitted.

Figure 10A:
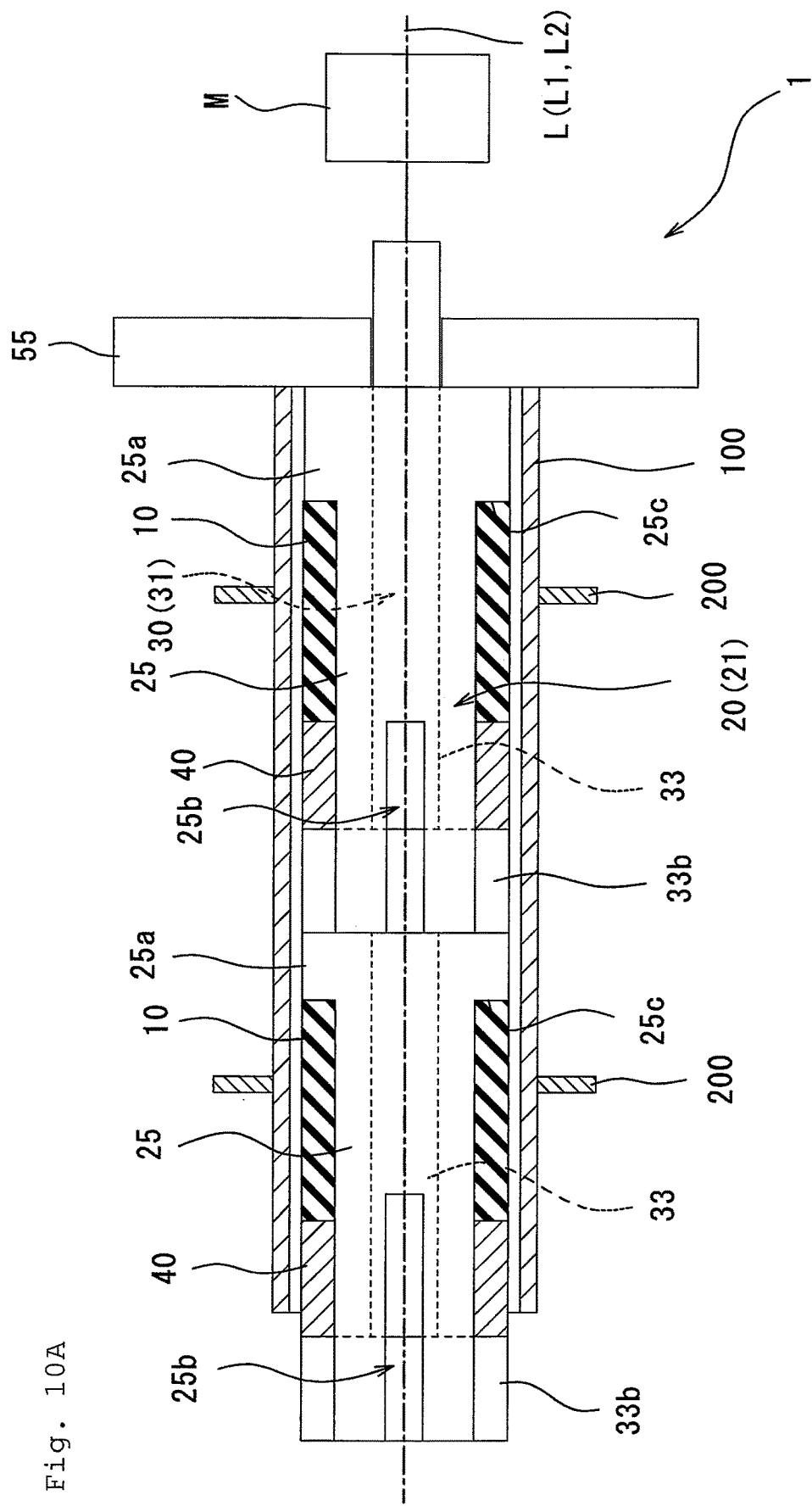
FIG. 10A is a partial sectional view of a member joining device according to a third embodiment before swaging and joining.

As shown in FIG. 10A, the member joining device 1 of the present embodiment includes the tubular unit 20, the shaft unit 30, the rubber member 10, the annular indenter 40, and a fixing plate 55 that has a flat surface.

As shown in FIG. 10A, when these components are assembled, the end surface of the flange portion 25a of the third tubular member 25 is brought into contact with the fixing plate 55 with the fixing plate 55 fixed perpendicularly to the central axis L, the rubber member 10 is arranged around the third tubular member 25, and then the annular indenter 40 is arranged around the third tubular member 25. Then, the shaft 33a of the shaft member 33 is inserted into the third tubular member 25, and the protrusion portion 33b is inserted into the slit 25b of the third tubular member 25. Next, the end surface of the flange portion 25a of another third tubular member 25 is brought into contact with the above-mentioned third tubular member 25, the rubber member 10 is arranged around the third tubular member 25, and then the annular indenter 40 is arranged around the third tubular member 25. Then, the shaft 33a of the shaft member 33 is inserted into the third tubular member 25, and the protrusion portion 33b is inserted into the slit 25b of the third tubular member 25. At this time, the two shaft members 33 are coupled by an arbitrary method such as screw fastening, and move integrally in the central axis L direction. In the assembled member joining device 1, the shaft member 33 is arranged radially inside the central axis L, the third tubular member 25 is arranged in the middle, and the annular indenter 40 and the rubber member 10 are arranged outside. That is, the member joining device 1 has a three-layer structure. In the central axis L direction, particularly the direction toward the fixing base 50, the tubular unit 20 is immovable, and the shaft unit 30 and the annular indenter 40 are movable.

In swaging and joining, first, the tube body 100 is inserted into the hole portion 201 of the wall portion 200. Next, the member joining device 1 is inserted inside the tube body 100. At this time, each of the rubber members 10 is aligned with the hole portion 201 of the wall portion 200 in the central axis L direction to fix the tubular unit 20.

Figure 10B:
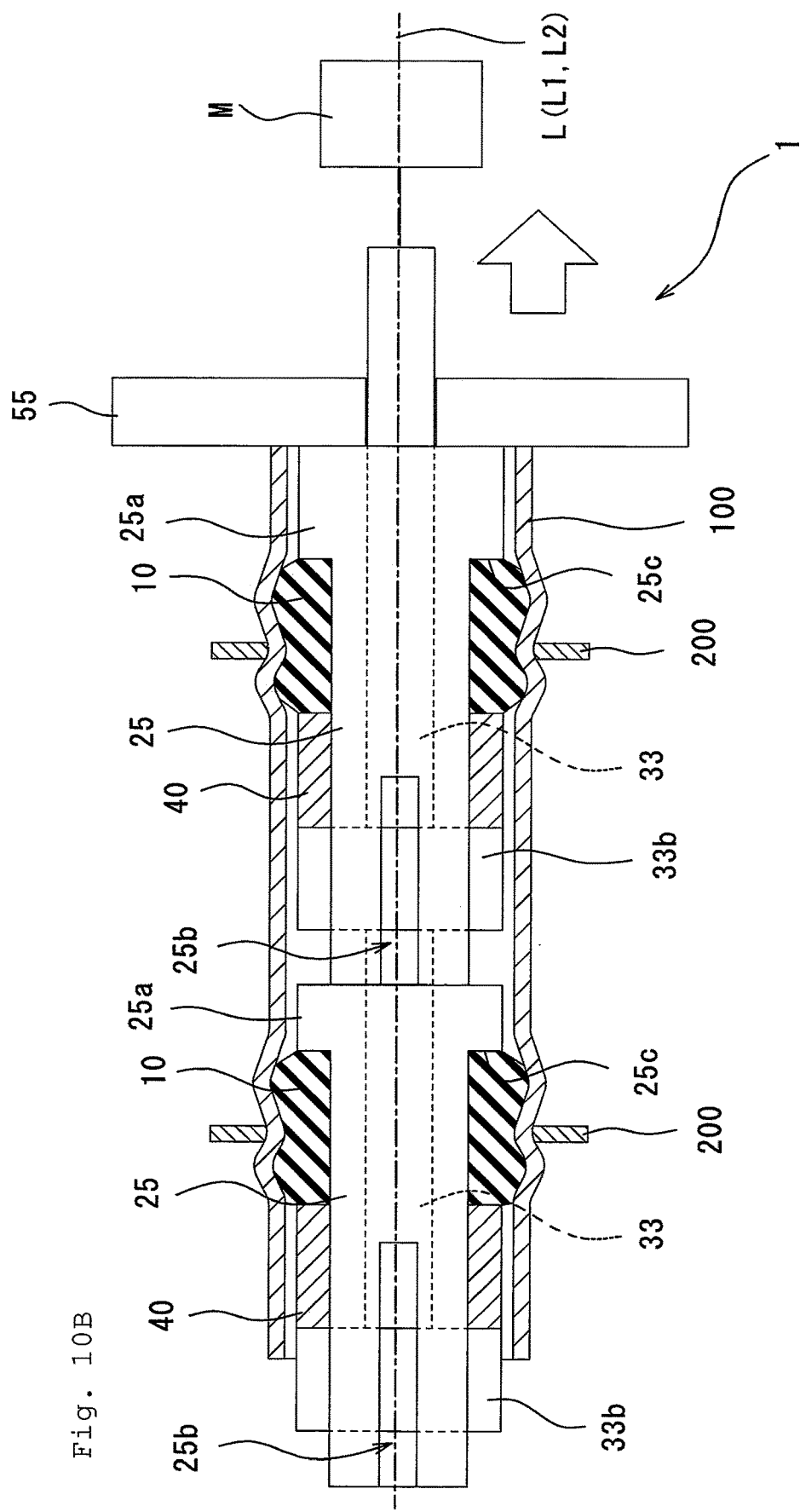
FIG. 10B is a partial sectional view of the member joining device according to the third embodiment after swaging and joining.

As shown in FIG. 10B, when a conceptually shown pulling mechanism (motion mechanism) 80 pulls (see the arrow in the figure) the shaft member 33 toward the fixing plate 55 in the central axis L direction after the alignment, the annular indenter 40 is pressed by the shaft member 33 and moves. Therefore, the space between the end surface of the annular indenter 40 and the receiving surface 25c of the flange portion 25a is narrowed, and the rubber members 10 are each compressed in the central axis L direction. With this compression, the rubber members 10 are each expanded toward the radially outside the central axis L, whereby the tube body 100 is expanded, and the tube body 100 is joined to the hole portion 201 of the wall portion 200 by press-fitting.

Figure 11A:
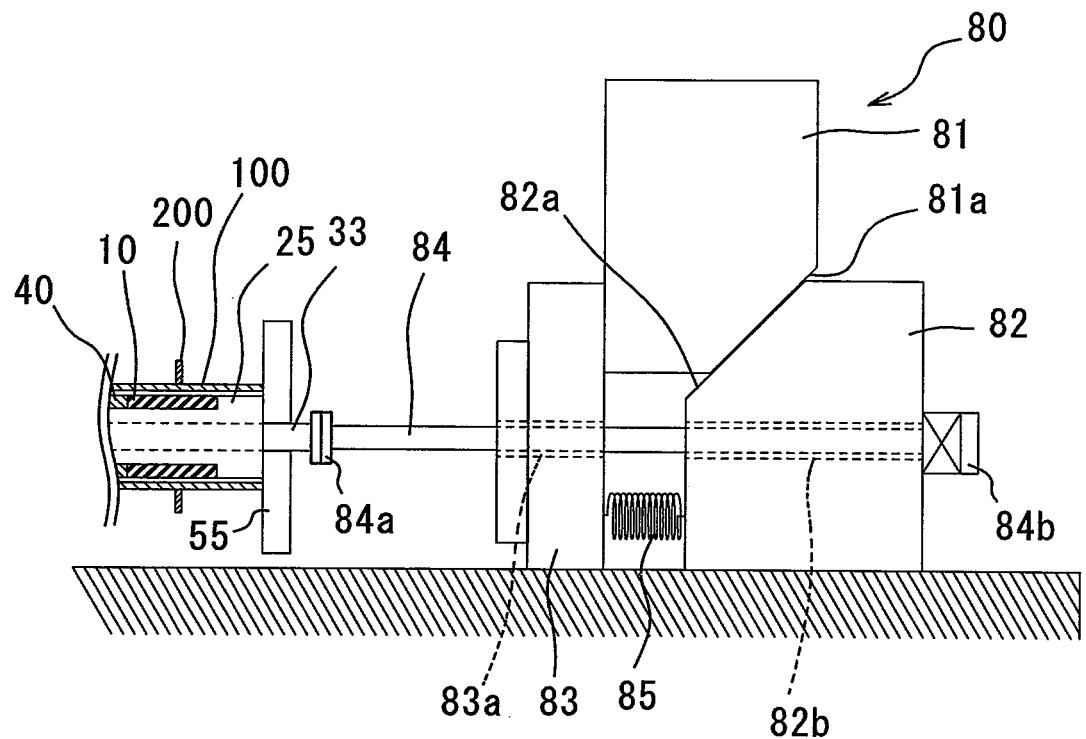
FIG. 11A is a side view of the motion mechanism before pulling.
Figure 11B:
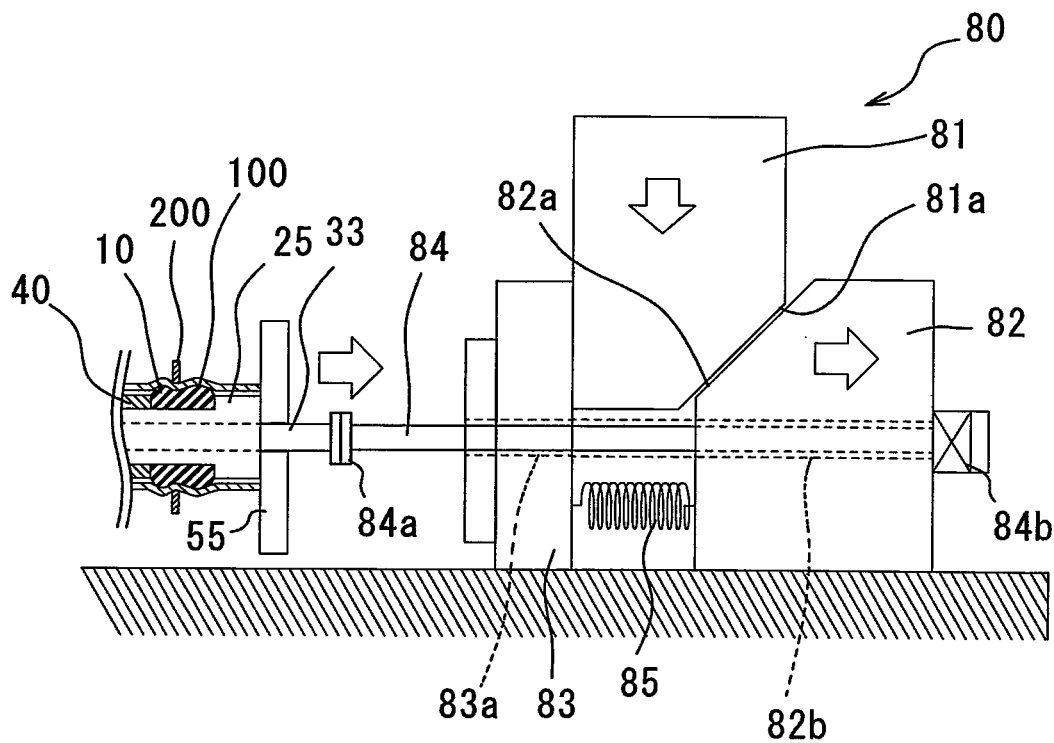
FIG. 11B is a side view of the motion mechanism after pulling.

FIGS. 11A and 11B show the pulling mechanism 80, which is an example of the motion mechanism M (see FIG. 9B). The pulling mechanism 80 includes a cam driver 81, a cam slider 82, a standing wall portion 83, and a guide shaft member 84. The cam driver 81 is arranged adjacent to the vertically upright standing wall portion 83 fixed to the floor surface, and is movable vertically along the standing wall portion 83. The cam driver 81 has an inclined surface 81a at its lower portion for transmitting a force to the cam slider 82. For the cam driver 81, a press machine or the like that is usually used for pressing or the like may be used. The cam slider 82 has a rail mechanism (not shown) on its lower surface and is movable horizontally. However, other than the rail mechanism, it is possible to adopt any mechanism such as a wheel that reduces the frictional force with the ground when moving. The cam slider 82 has an inclined surface 82a on its upper portion for receiving a force from the cam driver 81. Therefore, the inclined surface 81a of the cam driver 81 and the inclined surface 82a of the cam slider 82 are formed so as to be inclined with respect to each other. The guide shaft member 84 extends horizontally through the cam slider 82 and the standing wall portion 83. The cam slider 82 and the standing wall portion 83 have through-holes 82b and 83a, respectively, for receiving the guide shaft member 84, and the guide shaft member 84 can slide horizontally in the through-holes 82b and 83a. One end of the guide shaft member 84 is mechanically connected to the shaft member 33 by a coupling mechanism 84a, and the other end is connected to a locking member 84b such as a bolt that is larger than the through-hole 82b outside the cam slider 82 (opposite side of the standing wall portion 83).

The standing wall portion 83 and the cam slider 82 are elastically connected to each other via a coil spring 85. Accordingly, the cam slider 82 is biased toward the standing wall portion 83.

When a vertical force (downward in the figure) is applied to the cam driver 81, the force is transmitted from the cam driver 81 to the cam slider 82 via the inclined surfaces 81a and 82a. As a result, the cam driver 81 moves vertically (downward in the figure) and the cam slider 82 moves horizontally (rightward in the figure). When the cam slider 82 moves, the guide shaft member 84 having received the force via the locking member 84b also moves together, and pulls the shaft member 33 via the coupling mechanism 84a. The cam driver 81 and the cam slider 82 are an example of a cam mechanism.

The standing wall portion 83 and the cam slider 82 are elastically connected to each other via a coil spring 85. Accordingly, the cam slider 82 is biased toward the standing wall portion 83.

According to this pulling mechanism, similar to the pressing mechanism 70 (see FIGS. 7A and 7B) in the second embodiment, since the cam mechanism can convert the acting direction of the force, the arrangement of the tube body 100 to be swaged and joined can be arbitrarily selected.

Figure 12A:
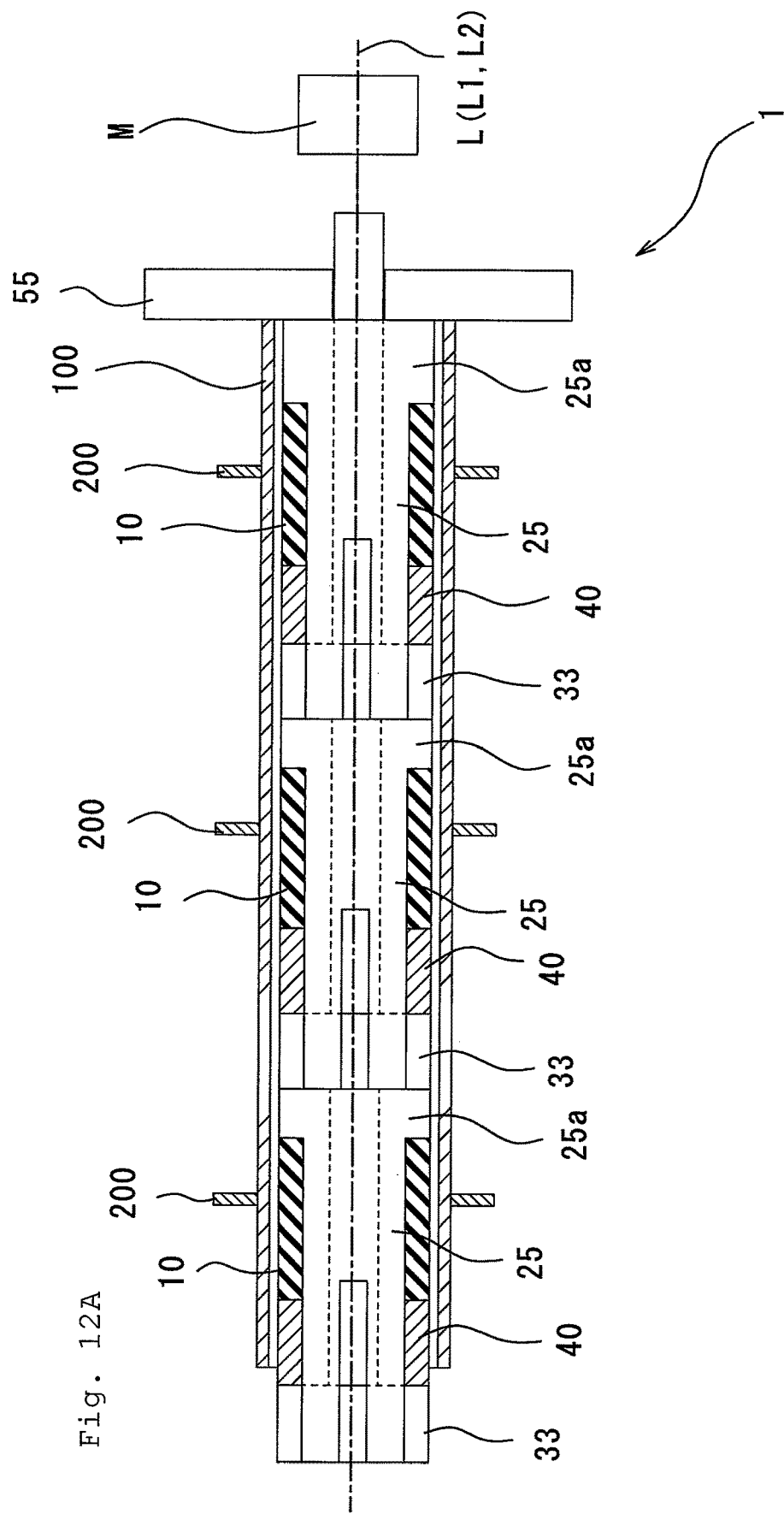
FIG. 12A is a partial sectional view of a modification of the member joining device according to the third embodiment before swaging and joining.
Figure 12B:
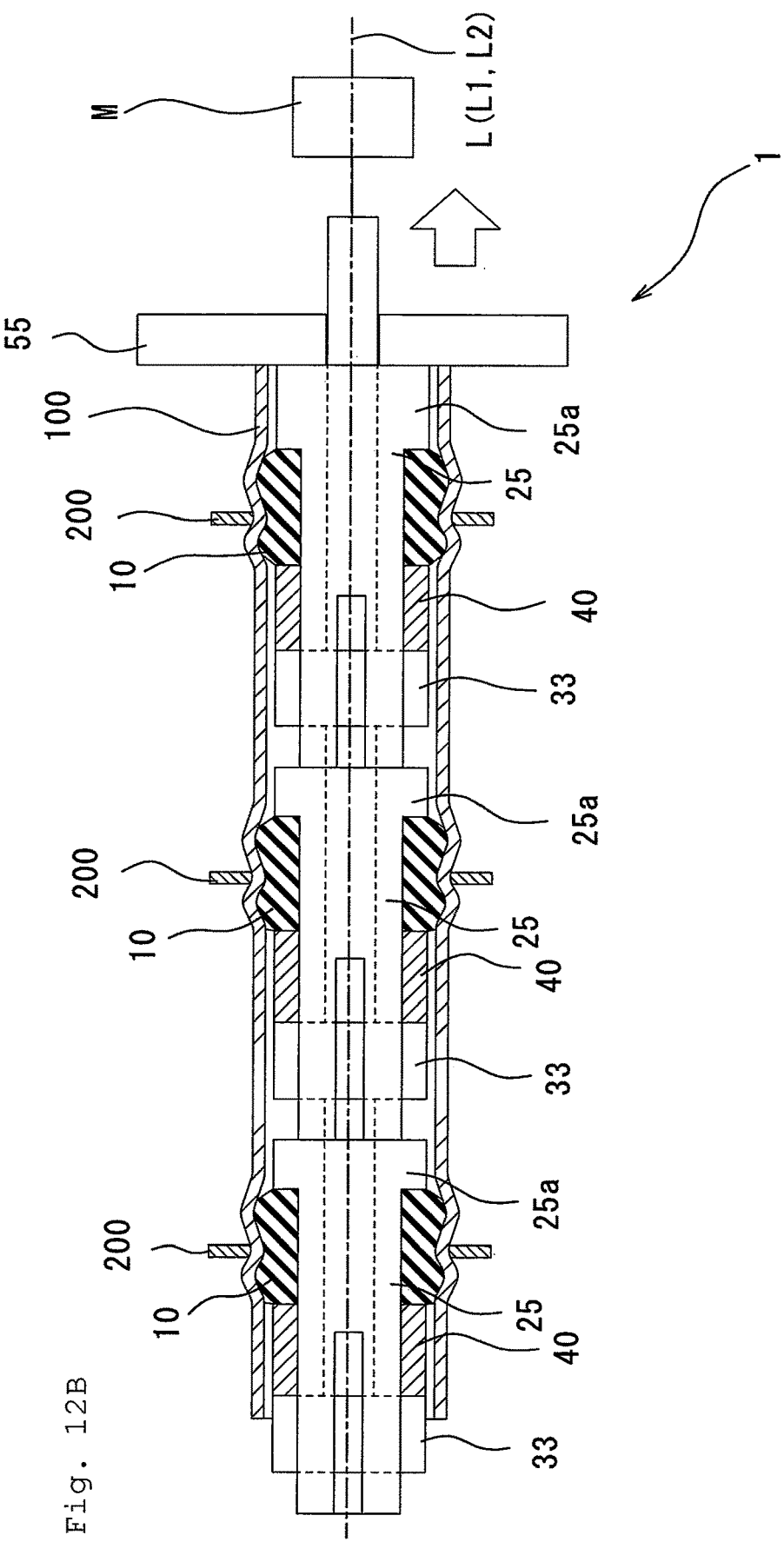
FIG. 12B is a partial sectional view of the modification of the member joining device according to the third embodiment after swaging and joining.

As shown in FIGS. 12A and 12B, in the modification of the present embodiment, three or more joint locations may be provided. The number of joint locations can be increased by continuously assembling the shaft member 33, the third tubular member 25, the annular indenter 40, and the rubber member 10 in addition to the configuration of the present embodiment (FIGS. 10A and 10B).

According to the present modification, three or more locations can be joined at one time. That is, by increasing the continuous configuration of the assembly, it is possible to arbitrarily increase the number of locations that can be joined at one time.

Embodiments (fourth to sixth embodiments) of the second aspect of the present invention will be described below with reference to the accompanying drawings. In the following embodiments, the materials of a tube body 100 and a wall portion 200 are not particularly limited, and may be different materials or the same material.

Fourth Embodiment

Figure 13:
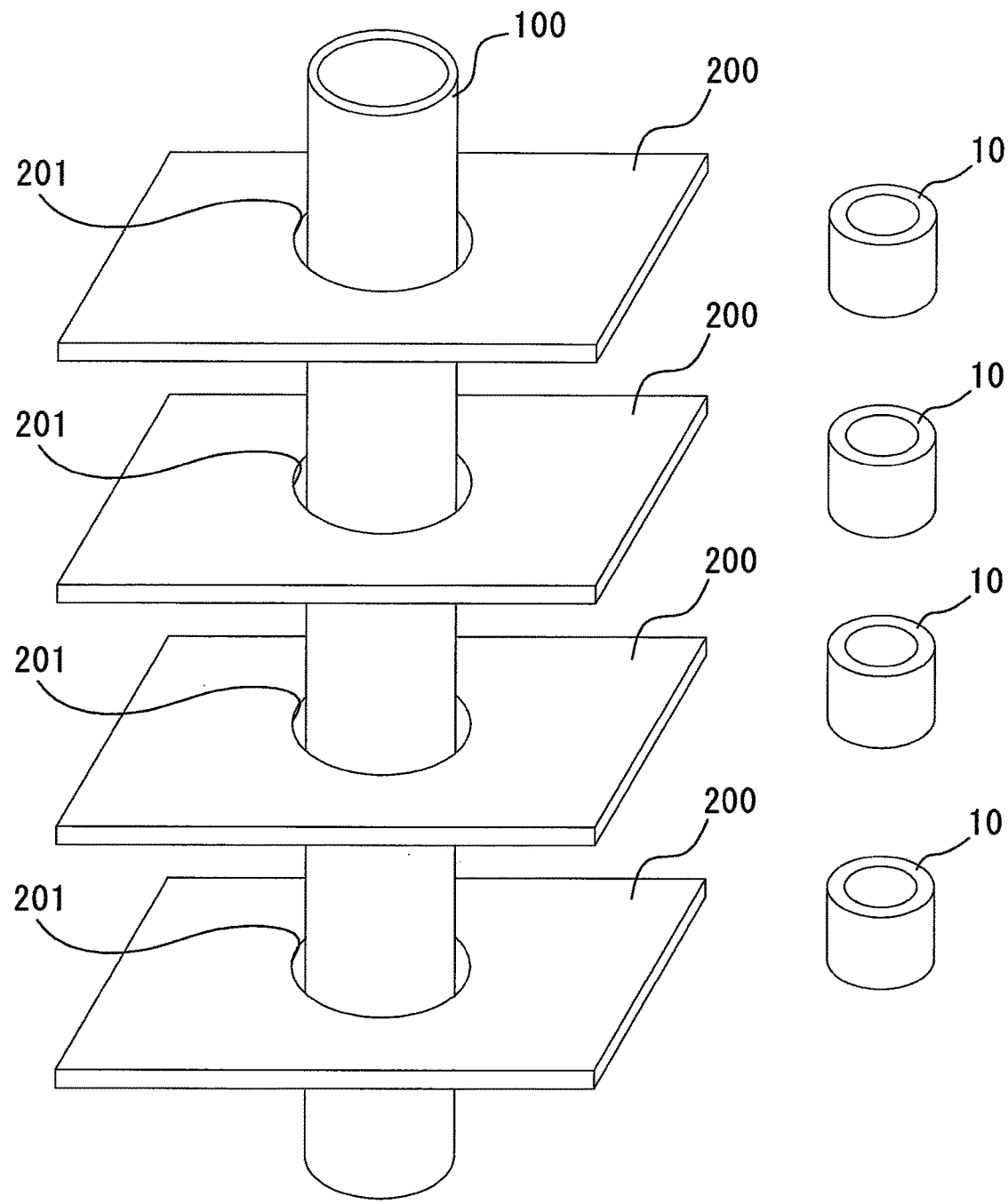
FIG. 13 is a perspective view showing the tube body, the wall portion, and the rubber member.

As shown in FIG. 13, in the present embodiment, the one tube body 100 and the four wall portions 200 are joined by press-fitting with the four rubber members (elastic members) 10. The present embodiment is a conceptual example for facilitating understanding of the present invention. Therefore, a specific detailed configuration will be described in the fifth and subsequent embodiments.

As shown in FIG. 13, the tube body 100 is a circular tube and may be, for example, an aluminum pipe. The wall portion 200 is a plate-like body formed with a circular hole portion 201 through which the tube body 100 can be inserted, and may be a part of a component made of high-tension steel, for example. In the present embodiment, the one tube body 100 is inserted through the hole portions 201 of the four wall portions 200 of the same shape. The tube body 100 is expanded at four locations by the rubber member 10, and is joined to the wall portion 200 at the four locations by press-fitting.

Figure 14:
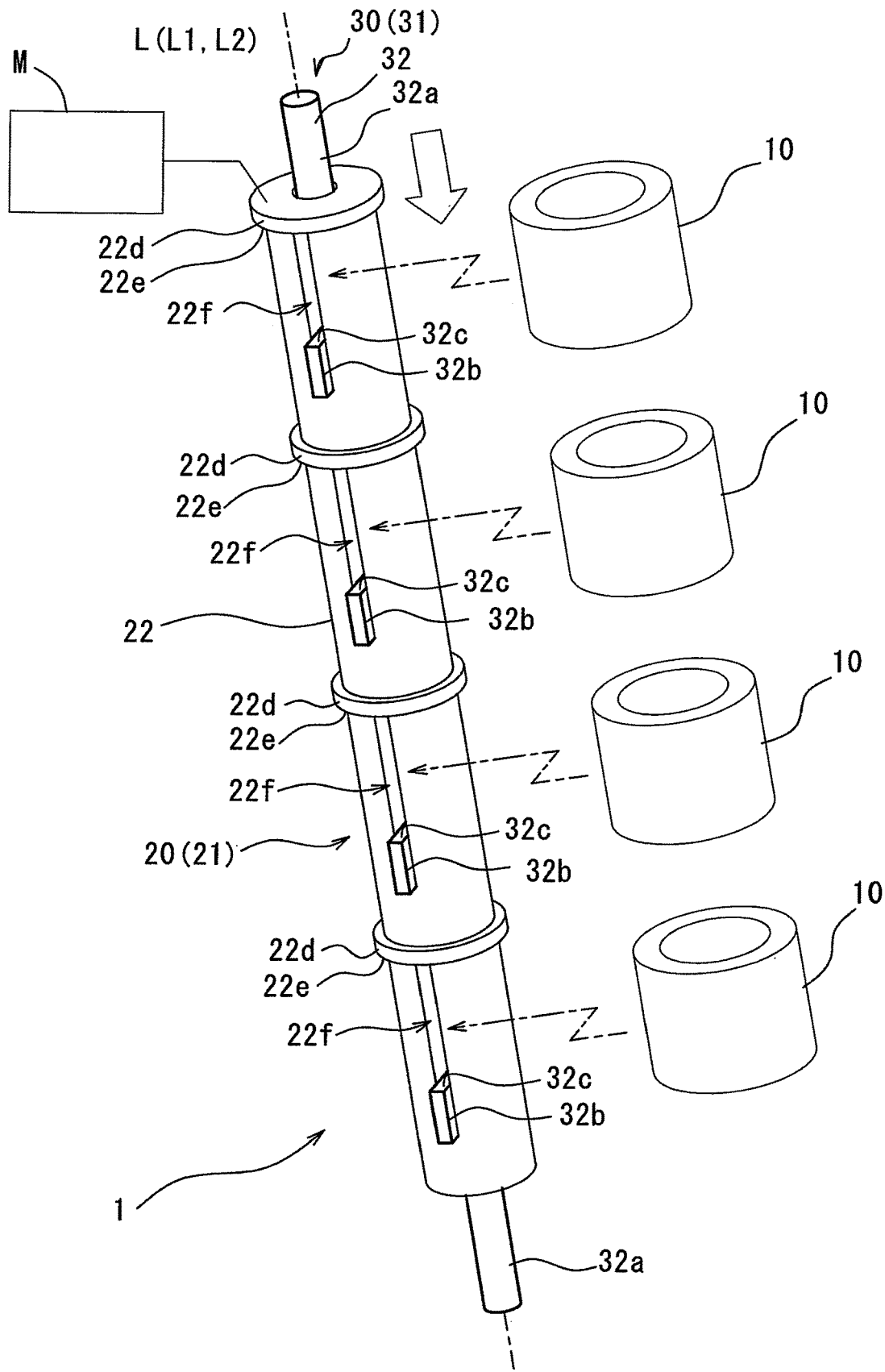
FIG. 14 is a perspective view of the member joining device according to a fourth embodiment.

As shown in FIG. 14, a member joining device 1 of the present embodiment includes a tubular unit 20, a shaft unit 30, four rubber members 10, and a motion mechanism M that is conceptually illustrated. In FIG. 14, the member joining device 1 is shown with the rubber members 10 being separated for clarity of illustration, but is actually used with the rubber members 10 being combined as described later (see long dashed short dashed line with arrow in FIG. 14).

The tubular unit 20 of the present embodiment includes the tubular assembly 21 constituted by the single tubular member 22 and four flange portions (pressing portions) 22d. The tubular member 22 is a generally cylindrical member that extends in a first central axis L1 direction. An outer peripheral surface of the tubular member 22 is formed with the four flange portions (pressing portions) 22d. In other words, the positions of the four flange portions 22d in the direction of the first central axis L1 are fixed with respect to the tubular assembly 21. One of the four flange portions 22d is formed on the end surface of the tubular member 22. The outer shape of each of the four flange portions 22d is circular as viewed in the direction of the first central axis L1, and is large enough to allow the tubular member 22 to be inserted into the tube body 100. The flange portion 22d has a pushing surface 22e that is a flat surface perpendicular to the first central axis L1. The tubular member 22 is provided with four slits 22f that extend in the direction of the first central axis L1.

The shaft unit 30 of the present embodiment includes a shaft assembly 31 constituted by a single shaft member 32 and four protrusion portions (receiving portions) 32b. The shaft member 32 has the generally columnar shaft 32a that extends in the direction of the second central axis L2, and the protrusion portion (receiving portion) 32b that protrudes radially outside the second central axis L2 is formed on the shaft 32a. In other words, the position of the protrusion portion 32b in the second central axis L2 direction is fixed with respect to the shaft assembly 31. As shown in FIG. 14, when the shaft unit 30 and the tubular unit 20 are combined, the directions of the first central axis L1 and the second central axis L2 are aligned with each other. Therefore, in the state where the shaft unit 30 and the tubular unit 20 are combined, the first central axis L1 and the second central axis L2 may be collectively referred to as the central axis L. Each of the protrusion portions 32b protrudes from the shaft 32a in two directions, and more specifically, is formed into an I-shape as viewed from the second central axis L2. The shaft 32a of the shaft member 32 is smaller than the inner diameter of the tubular member 22 in the radial direction, and the protrusion portion 32b is larger than the outer diameter of the tubular member 22. The shaft member 32 can be inserted into the tubular member 22, and in the inserted state, the protrusion portion 32b penetrates the tubular member 22 through the slit 22f of the tubular member 22 and protrudes radially outside the tubular member 22. Therefore, the shaft member 32 can linearly move relative to the tubular member 22 in the central axis L direction partially inside and outside the tubular member 22. The protrusion portion 32b has the receiving surface 32c that is a flat surface perpendicular to the second central axis L2. The receiving surface 32c faces the pushing surface 22e of the flange portion 22d in the central axis L direction. Accordingly, the distance between the pushing surface 32c and the receiving surface 22e changes due to the above-described linear motion.

The four rubber members 10 have a cylindrical shape with both end surfaces being flat surfaces, and are all the same. The rubber member 10 is preferably made of, for example, any of urethane rubber, chloroprene rubber, CNR rubber (chloroprene rubber and nitrile rubber), and silicon rubber. The hardness of the rubber member 10 is preferably 30 or more in Shore A.

The member joining device 1 is configured by the tubular unit 20 being inserted into the shaft unit 30 and each of the rubber members 10 is arranged radially outside the tubular member 22 between the flange portion 22d and the protrusion portion 32b.

Figure 15:
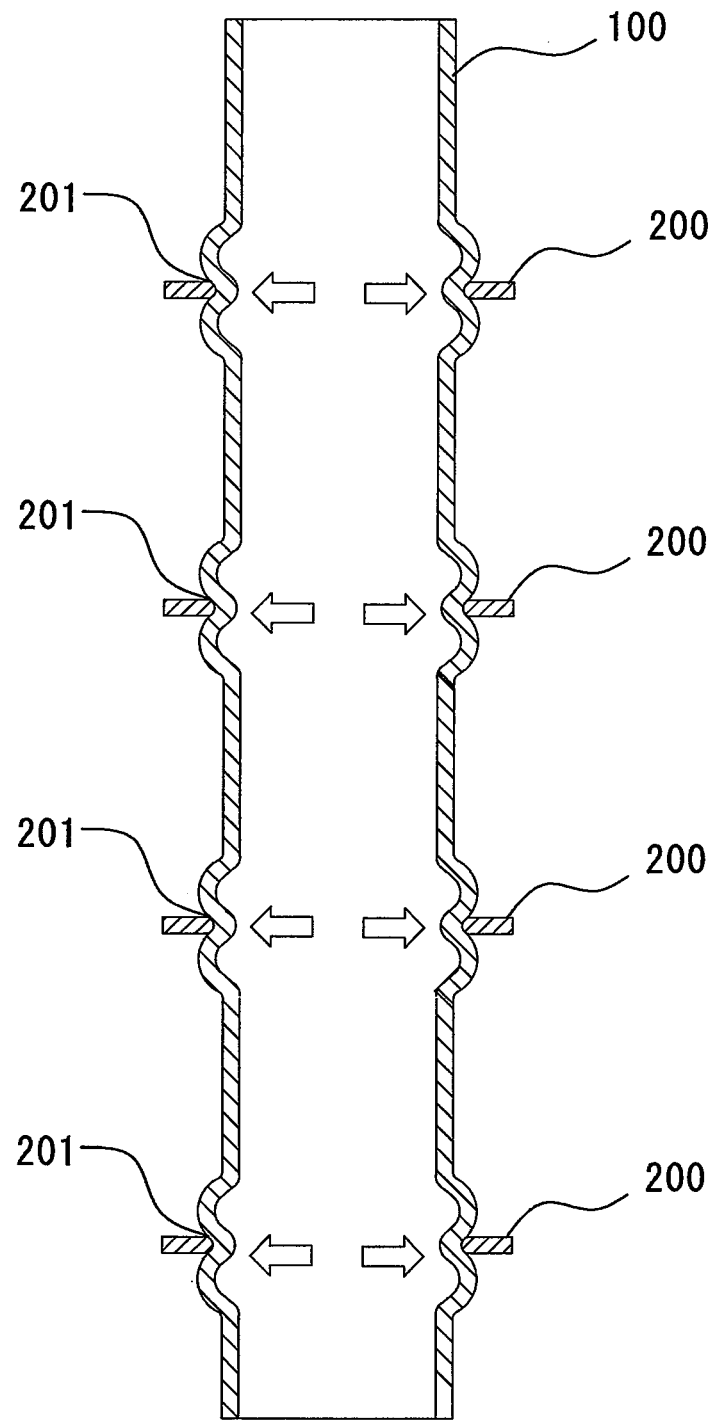
FIG. 15 is a sectional view showing the tube body and the wall portion after joining.

When swaging and joining, as shown in FIG. 13, the tube body 100 is first inserted into the hole portions 201 of the four wall portions 200. Next, the member joining device 1 shown in FIG. 14 is inserted inside the tube body 100 in a combined state. At this time, each of the rubber members 10 is aligned with the hole portion 201 of the wall portion 200 in the central axis L direction to fix the shaft unit 30. After that, the motion mechanism M moves the tubular unit 20 in the central axis L direction with respect to the shaft unit 30 (see the arrow in FIG. 14). This narrows the space between the pushing surface 22e of the flange portion 22d and the receiving surface 32c of the protrusion portion 32b, and the pushing surface 32e and the receiving surface 32c compress the rubber members 10 in the central axis L direction. With this compression, each of the rubber members 10 is expanded toward the radially outside the central axis L, and as shown in FIG. 15, each portion of the tube body 100 is expanded by the rubber member 10, and the tube body 100 is joined to the hole portion 201 of the wall portion 200 by press-fitting. The present invention is a conceptual example as mentioned earlier, and in practice, it is preferable to perform swaging and joining by increasing the area of the receiving surface 32c or using a member such as the annular indenter 40 (see FIG. 17 and the like) of the second embodiment and subsequent embodiments.

According to the present embodiment, the tube body 100 and the wall portion 200 can be simultaneously and accurately joined at four locations by press-fitting.

In the configuration of the present embodiment, the tube body 100 and the wall portion 200 can be joined at four locations by press-fitting with the four rubber members 10 arranged between the flange portion 22d and the protrusion portion 32b.

According to the present embodiment, since the position of each of the flange portions 22d in the central axis L direction is fixed with respect to the tubular assembly 21, the flange portions 22d move in synchronization with one another. Therefore, the joining at these four locations by press-fitting can be performed simultaneously.

According to the present embodiment, since the rubber member 10 is supported by the protrusion portion 32b in the central axis L direction, the position of the rubber member 10 in the central axis L direction does not change at the time of swaging and joining. Therefore, each of the rubber members 10 can be deformed at the accurate position, and each portion of the tube body 100 can be expanded at the accurate position. Accordingly, only a necessary portion of the tube body 100 can be accurately expanded without expanding an unnecessary portion of the tube body, and hence the tube body can be accurately joined by press-fitting.

According to the present embodiment, by providing the slit 22f in the tubular member 22, the protrusion portion 32b can protrude radially outside the central axis L from the tubular member 22. The slit 22f extends in the central axis L direction and the protrusion portion 32b is arranged to be relatively linearly movable in the slit 22f. Therefore, the tubular member 22 can be configured to be linearly movable in the central axis L direction outside the shaft member 32. That is, it is possible to easily realize the configuration that includes the protrusion portion 32b, which is immovable in the central axis L direction, and the flange portion 22d, which is movable in the central axis direction.

Fifth Embodiment

With reference to FIGS. 16 to 19B, the member joining device 1 of the present embodiment is substantially the same as that of the fourth embodiment except for a detailed configuration. Accordingly, the same components as those in the configuration shown in the fourth embodiment are denoted by the same reference numerals and the description thereof may be omitted.

Figure 16:
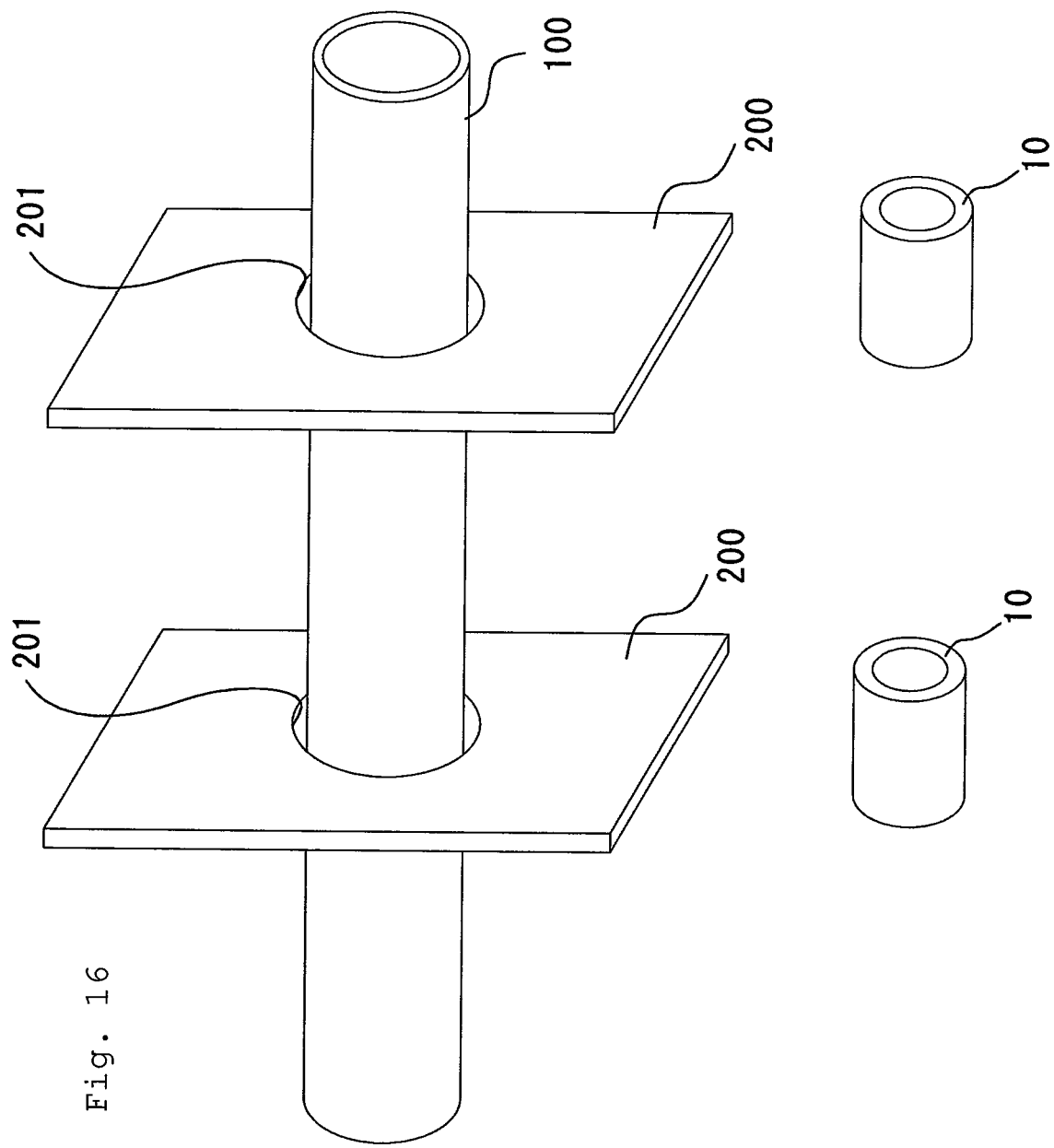
FIG. 16 is a perspective view showing the tube body, the wall portion, and the rubber member.

As shown in FIG. 16, in the present embodiment, the one tube body 100 and the two wall portions 200 are joined by press-fitting with the two rubber members 10. In particular, the tube body 100 is preferably arranged so as to horizontally extend from the viewpoint of ease of handling.

As shown in FIG. 17, the member joining device 1 of the present embodiment includes the tubular unit 20, the shaft unit 30, the rubber member 10, and the annular indenter (annular member) 40.

The tubular unit 20 of the present embodiment includes the tubular assembly 21 constituted by the two first tubular members 23, and a flange portion 23b (pressing portion). The first tubular member 23 is a generally cylindrical member that extends in the first central axis L1 direction. One end portion of the first tubular member 23 is formed with the flange portion 23b. In other words, the position of the flange portion 23b in the first central axis L1 direction is fixed with respect to the tubular assembly 21. The outer diameter of the flange portion 23b is circular as viewed from the first central axis L1 direction. The flange portion 23b has a pushing surface 23c that is a flat surface perpendicular to the first central axis L1 direction. The other end of the first tubular member 23 is formed with four slits 23d. The four slits 23d are formed at equal intervals in the circumferential direction of the first tubular member 23 and extend in the first central axis L1 direction. One end surface of the first tubular member 23 is provided with a counterbore hole 23e, which is concave in the first central axis L1 direction. The counterbore hole 23e is circular as viewed in the first central axis L1 direction, and is large enough to partially receive the other end portion of another first tubular member 23.

The shaft unit 30 of the present embodiment includes the shaft assembly 31 constituted by the two shaft members 33, and the protrusion portion (receiving portion) 33b. The shaft member 33 has a columnar shaft 33a that extends in the second central axis L2 direction, and the protrusion portion 33b that protrudes in four directions radially outside the second central axis L2. In other words, the position of the protrusion portion 33b in the second central axis L1 direction is fixed with respect to the shaft assembly 31. The protrusion portions 33b are formed at equal intervals in the circumferential direction of the shaft 33a, that is, they are formed in a cross shape as viewed from the second central axis L2 direction. The shaft 33a has a shape capable of being inserted into the first tubular member 23, and the protrusion portion 33b has a shape capable of being inserted into the slit 23d of the first tubular member 23. Therefore, when the tubular assembly 21 linearly moves in the central axis L direction, the shaft member 33 can linearly move relatively in the central axis L direction partially inside and outside the first tubular member 23. The protrusion portion 33b has the receiving surface 33c that is a flat surface perpendicular to the second central axis L2. The receiving surface 33c faces the pushing surface 23c in the central axis L direction. Accordingly, the distance between the pushing surface 33c and the receiving surface 23c changes due to the above-described linear motion.

The two rubber members 10 of the present embodiment are substantially the same as those of the fourth embodiment, and are both cylindrical.

The two annular indenters 40 of the present embodiment have the same shape and are cylindrical members with both end surfaces being flat surfaces. The annular indenter 40 has a shape capable of being arranged around each of the first tubular members 23, that is, the first tubular member 23 can be inserted into the annular indenter 40. The material of the annular indenter 40 is not particularly limited, but is preferably a material that does not deform due to the pressing force generated at the time of swaging and joining, and may be, for example, steel.

As shown in FIG. 18A, when assembling these components, the rubber member 10 is arranged around the first tubular member 23, and subsequently, the annular indenter 40 is arranged around the first tubular member 23. Then, the shaft 33*a* of the shaft member 33 is inserted into the first tubular member 23, and the protrusion portion 33*b* is inserted into the slit 23*d* of the first tubular member 23. Next, another first tubular member 23 is coupled to the above-mentioned first tubular member 23. Then, the rubber member 10 is arranged around the first tubular member 23, and subsequently, the annular indenter 40 is arranged around the first tubular member 23. Then, the shaft 33*a* of the shaft member 33 is inserted into the first tubular member 23, and the protrusion portion 33*b* is inserted into the slit 23*d* of the first tubular member 23. Then, the shaft unit 30 is fixed so as to limit the motion in the central axis L direction. In the thus assembled member joining device 1, the shaft member 33 is arranged radially inside the central axis L, the first tubular member 23 is arranged in the middle, and the annular indenter 40 and the rubber member 10 are arranged outside. That is, the member joining device 1 has a three-layer structure. In the central axis L direction, the shaft unit 30 and the annular indenter 40 are immovable, and the tubular unit 20 is movable.

In swaging and joining, first, the tube body 100 is inserted into the hole portion 201 of the wall portion 200. Next, the member joining device 1 is inserted inside the tube body 100. At this time, each of the rubber members 10 is aligned with the hole portion 201 of the wall portion 200 in the central axis L direction to fix the shaft unit 30.

Figure 18B:
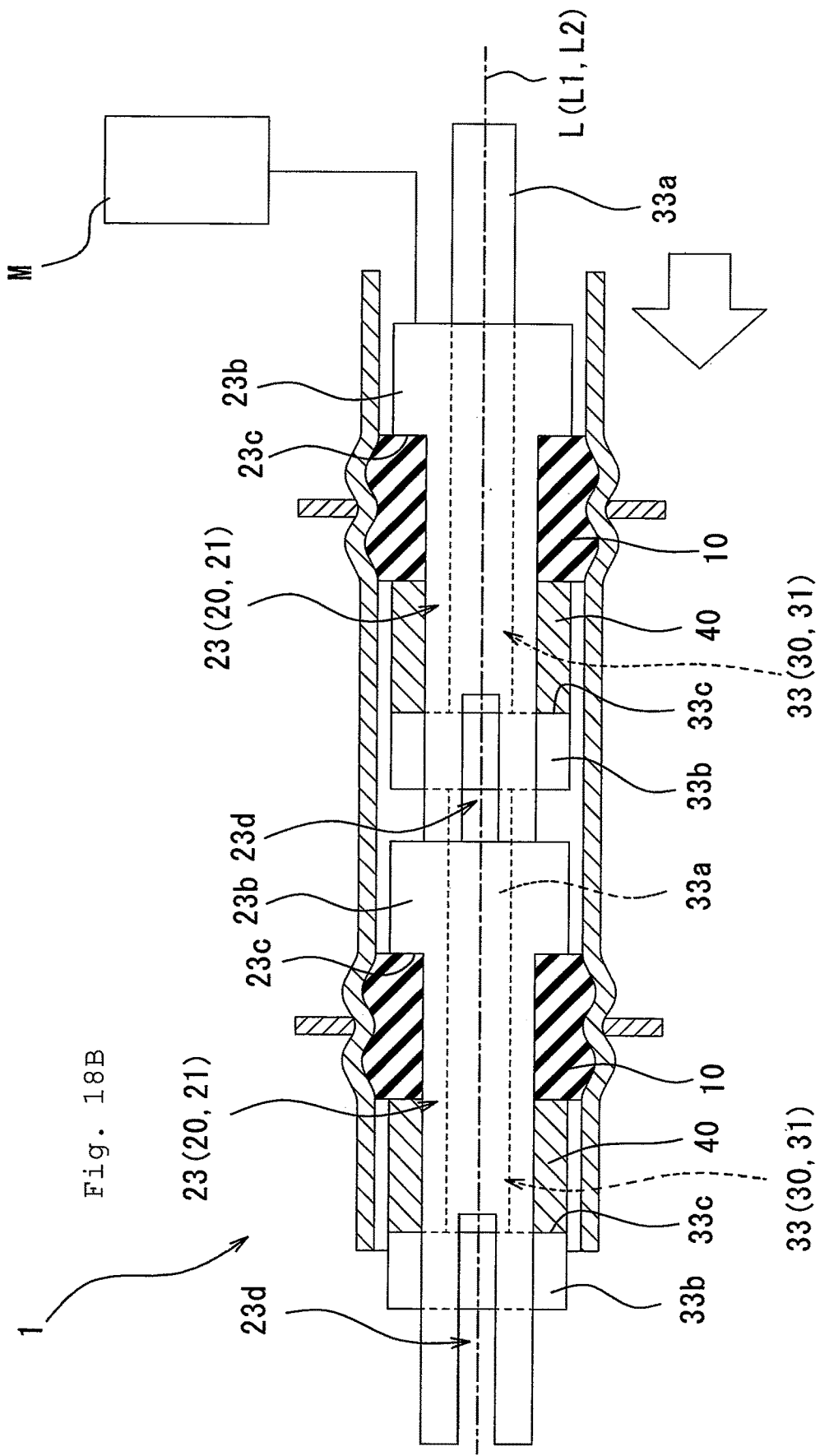
FIG. 18B is a partial sectional view of the member joining device according to the fifth embodiment after swaging and joining.

As shown in FIG. 18B, the conceptually shown motion mechanism M moves the tubular unit 20 in the central axis L direction (see the arrow in the figure) after the alignment. With this movement, the space between the pushing surface 23*c* of the flange portion 23*b* and the receiving surface 33*c* of the protrusion portion 33*b* of the shaft member 33 (or the end surface of the annular indenter 40) is narrowed, and the rubber members 10 are each compressed in the central axis L direction. With this compression, the rubber members 10 are each expanded toward the radially outside the central axis L, whereby the tube body 100 is expanded, and the tube body 100 is joined to the hole portion 201 of the wall portion 200 by press-fitting.

According to the present embodiment, the tube body 100 and the wall portion 200 can be simultaneously and accurately joined at two locations by press-fitting.

In the configuration of the present embodiment, the tube body 100 and the wall portion 200 can be joined at two locations by press-fitting with the two rubber members 10 each arranged between the protrusion portion 33*b* and the flange portion 23*b*.

According to the present embodiment, since the positions of the flange portions 23*b* in the central axis L direction are fixed with respect to the tubular assembly 21, the flange portions 23*b* move in synchronization with one another. Therefore, the joining at these two locations by press-fitting can be performed simultaneously.

According to the present embodiment, since the rubber member 10 is supported by the receiving surface 33*c* of the protrusion portion 33*b* of the shaft member 33, the positions of the two rubber members 10 in the central axis L direction do not change even at the time of swaging and joining. Therefore, each of the two rubber members 10 can be deformed at the accurate position, and each portion of the tube body 100 can be expanded at the accurate position. Accordingly, only a necessary portion of the tube body 100 can be accurately expanded without expanding an unnecessary portion of the tube body, and hence the tube body can be accurately joined by press-fitting.

According to the present embodiment, by providing the slit 23*d* in the first tubular member 23, the protrusion portion 33*b* can protrude radially outside the central axis L from the first tubular member 23. Since the slit 23*d* extends in the central axis L direction and the protrusion portion 33*b* is arranged to be relatively linearly movable in the slit 23*d*, the tubular assembly 21 can be configured to be linearly movable in the central axis L direction outside the shaft member 33. That is, it is possible to easily realize the configuration that includes the protrusion portion 33*b*, which is immovable in the central axis L direction, and the flange portion 23*b*, which is movable in the central axis direction.

According to the present embodiment, the rubber members 10 can be supported uniformly by the annular indenter 40. If the annular indenter 40 is not provided, the protrusion portion 33*b* directly supports the rubber member 10. Since the protrusion portion 33*b* has a cross shape, an unintended deformation of the rubber member 10 may be caused. Specifically, since the protrusion portion 33*b* has a shape that unevenly supports only a few locations of the surface of the rubber member 10, only the few unevenly pressed locations of the rubber member 10 may be unevenly deformed, and the tube body 100 may not be uniformly expanded. However, as in the configuration of the present embodiment, when the rubber member 10 is supported through the annular indenter 40, a force can be uniformly applied to the rubber member 10 over the circumferential direction of the central axis L, and it is hence possible to prevent an unintended deformation of the rubber member 10 and to stably perform joining by press-fitting.

According to the present embodiment, the protrusion portion 33*b* is formed point-symmetrically about the central axis L in a cross section perpendicular to the central axis L of the shaft member 33, and more specifically, is formed in a cross shape. Such a point-symmetric formation makes it easy to apply a force uniformly to the rubber member 10. That is, the possibility of causing an unintended deformation of the rubber member 10 as described above can be reduced.

Figure 19A:
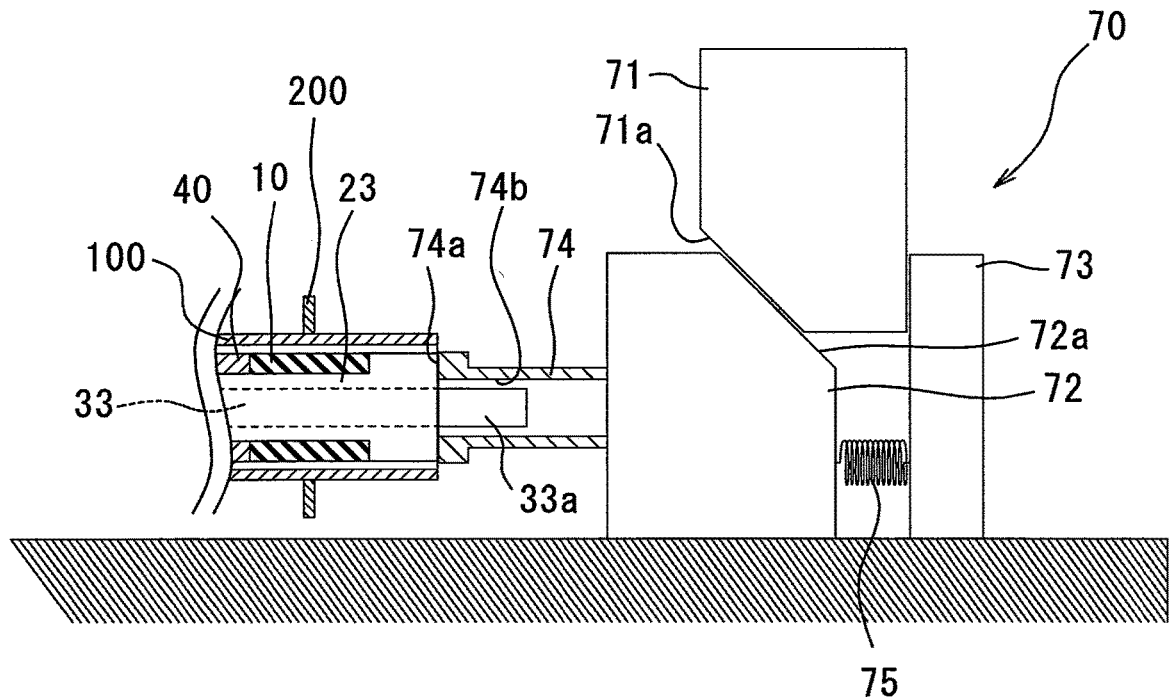
FIG. 19A is a partial sectional view of the motion mechanism before pressing.
Figure 19B:
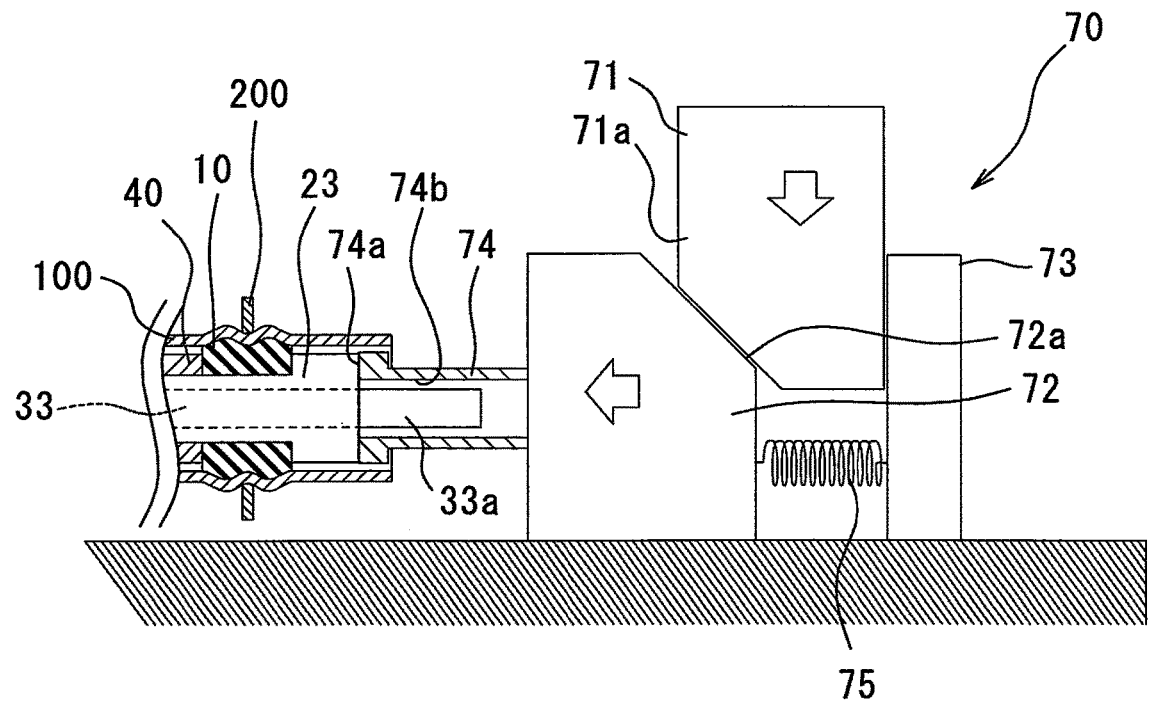
FIG. 19B is a partial sectional view of the motion mechanism after pressing.

FIGS. 19A and 19B show the pressing mechanism 70, which is an example of the motion mechanism M (see FIGS. 18A and 18B). The pressing mechanism 70 includes a cam driver 71, a cam slider 72, a standing wall portion 73, and a cylindrical extrusion base 74. The cam driver 71 is arranged adjacent to the vertically upright standing wall portion 73 fixed to the floor surface, and is movable vertically along the standing wall portion 73. The cam driver 71 has an inclined surface 71*a* at its lower portion for transmitting a force to the cam slider 72. For the cam driver 71, a press machine or the like that is usually used for pressing or the like may be used. The cam slider 72 has a rail mechanism (not shown) on its lower surface and is movable horizontally. However, other than the rail mechanism, it is possible to adopt any mechanism such as a wheel that reduces the frictional force with the ground when moving. The cam slider 72 has an inclined surface 72*a* on its upper portion for receiving a force from the cam driver 71. Therefore, the inclined surface 71*a* of the cam driver 71 and the inclined surface 72*a* of the cam slider 72 are formed so as to be inclined with respect to each other. The extrusion base 74 extends horizontally and has the flat pressing surface 74*a* for pressing the first tubular member 23. The extrusion base 74 has a through-hole 74*b* having a circular cross section that extends horizontally. The through-hole 74*b* is large enough to receive the shaft 33*a* of the shaft member 33. The extrusion base 74 is attached to the cam slider 72 and moves horizontally together with the cam slider 72.

When a vertical force (downward in the figure) is applied to the cam driver 71, the force is transmitted from the cam driver 71 to the cam slider 72 via the inclined surfaces 71a and 72a. As a result, the cam driver 71 moves vertically (downward in the figure) and the cam slider 72 moves horizontally (leftward in the figure). When the cam slider 72 moves, the extrusion base 74 also moves together and presses the first tubular member 23. At this time, since the shaft member 33 is inserted into the through-hole 74b, the shaft member 33 does not receive a force from the extrusion base 74. The cam driver 71 and the cam slider 72 are an example of a cam mechanism.

The standing wall portion 73 and the cam slider 72 are elastically connected to each other via a coil spring 75. Accordingly, the cam slider 72 is biased toward the standing wall portion 73.

According to this pressing mechanism 70, since the cam mechanism can convert the acting direction of the force, the arrangement of the tube body 100 to be swaged and joined can be arbitrarily selected. For example, normally, a processing machine such as a press machine that applies a compression force applies a compression force in the vertical direction. The cam mechanism can convert a vertical force applied by a processing machine such as the normal press machine into a horizontal force, for instance. Accordingly, it is also possible to horizontally arrange the tube body 100 to be swaged and joined while using a processing machine such as the normal press machine. Furthermore, when the tube body 100 is a long member, it is possibly joined with the plurality of wall portions 200 by press-fitting, and hence it is particularly effective that the joining can be simultaneously and accurately performed at a plurality of locations by press-fitting. However, when the tube body 100 is a long member, since a limit stroke is defined in a facility such as the normal pressing machine that vertically applies a compression force, there is a possibility that the swaging and joining cannot be performed due to the limitation of dimensions. However, in the above configuration, since the cam mechanism can convert the acting direction of the force, the swaging and joining can be performed by selecting an arbitrary arrangement that is not affected by the limit stroke without being subjected to dimension restriction.

Figure 20B:
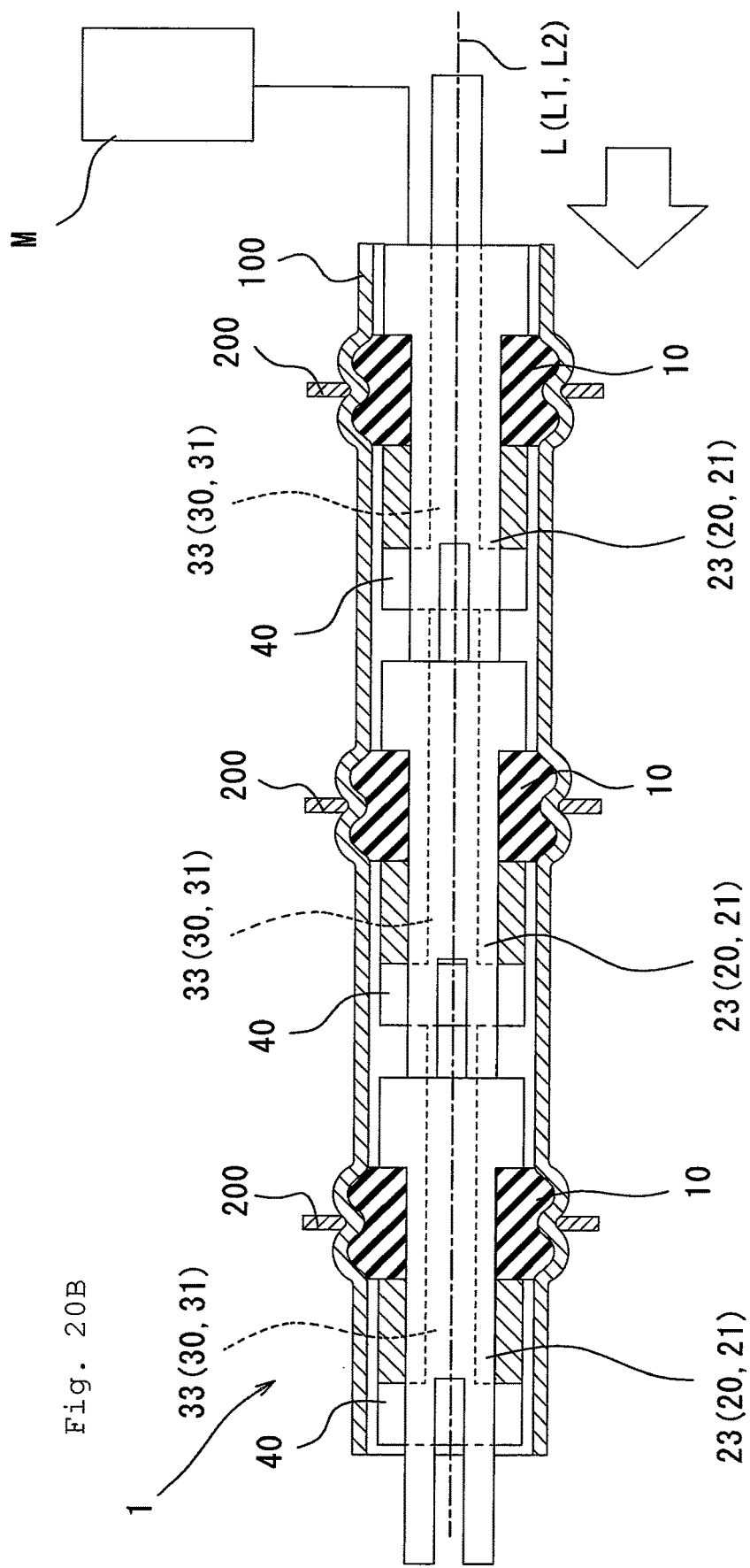
FIG. 20B is a partial sectional view of a modification of the member joining device according to the fifth embodiment after swaging and joining.

As shown in FIGS. 20A and 20B, in the modification of the present embodiment, three or more joint locations may be provided. The number of joint locations can be increased by continuously assembling the shaft member 33, the first tubular member 23, the annular indenter 40, and the rubber member 10 in addition to the configuration of the present embodiment.

According to the present modification, three or more locations can be joined at one time. That is, by increasing the continuous configuration of the assembly, it is possible to arbitrarily increase the number of locations that can be joined at one time.

Sixth Embodiment

With reference to FIGS. 21A to 22B, the member joining device 1 of the present embodiment is substantially the same as that of the fifth embodiment except for a detailed configuration. Accordingly, the same components as those in the configuration shown in the second embodiment are denoted by the same reference numerals and the description thereof may be omitted.

As shown in FIG. 21A, the member joining device 1 of the present embodiment includes the tubular unit 20, the shaft unit 30, the rubber member 10, and the annular indenter 40.

The shaft unit 30 of the present embodiment includes the shaft assembly 31 constituted by the single shaft member 33, the protrusion portion (receiving portion) 33b, and a support indenter (receiving portion) 56. The shaft member 33 is the same as that of the fifth embodiment. The support indenter 56 is a cylindrical member and has a receiving surface 56a that is a flat surface perpendicular to the second central axis L2. The support indenter 56 is configured to be capable of being fixed to a fixed object such as a floor surface, and when assembled as described later, the support indenter 56 is fixed and used.

As shown in FIG. 21A, when these components are assembled, the rubber member 10 is arranged around the first tubular member 23, and subsequently, the annular indenter 40 is arranged around the first tubular member 23. Then, the protrusion portion 33b of the shaft member 33 is inserted into the slit 23d of the first tubular member 23. Next, another first tubular member 23 is coupled to the above-mentioned first tubular member 23. This coupling allows the two first tubular members 23 to move integrally in the central axis L direction by an arbitrary method such as screw fastening. Then, the rubber member 10 is arranged around the first tubular member 23, and subsequently, the support indenter 56 is arranged around the first tubular member 23. At this time, the shaft member 33 and the first tubular member 23 penetrate the support indenter 56. Then, the shaft unit 30 is fixed so as to limit the motion in the central axis L direction. In the assembled member joining device 1, the shaft member 33 is arranged radially inside the central axis L, the first tubular member 23 is arranged in the middle, and the annular indenter 40 and the rubber member 10 are arranged outside. That is, the member joining device 1 has a three-layer structure. In the central axis L direction, the shaft unit 30, the annular indenter 40, and the support indenter 56 are immovable, and the tubular unit 20 is movable.

In swaging and joining, first, the tube body 100 is inserted into the hole portion 201 of the wall portion 200. Next, the member joining device 1 is inserted inside the tube body 100. At this time, each of the rubber members 10 is aligned with the hole portion 201 of the wall portion 200 in the central axis L direction to fix the shaft unit 30.

Figure 21B:
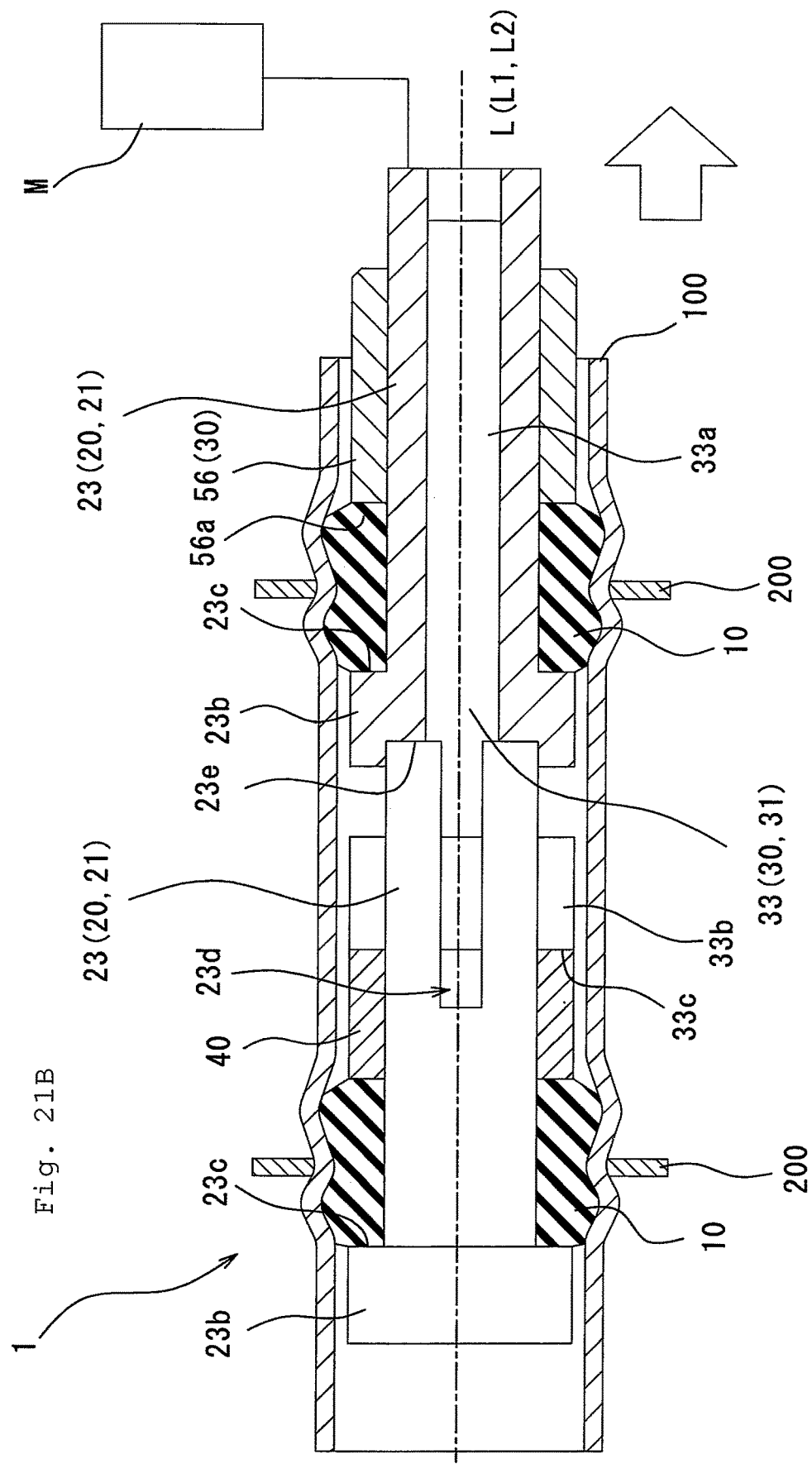
FIG. 21B is a partial sectional view of the member joining device according to the sixth embodiment after swaging and joining.

As shown in FIG. 21B, the conceptually shown motion mechanism M pulls the tubular unit 20 in the central axis L direction (see the arrow in the figure) after the alignment. Then, the space between the end surface of the annular indenter 40 and the pushing surface 23c of the flange portion 23b is narrowed, and the rubber members 10 are each compressed in the central axis L direction. With this compression, the rubber members 10 are each expanded toward the radially outside the central axis L, whereby the tube body 100 is expanded, and the tube body 100 is joined to the hole portion 201 of the wall portion 200 by press-fitting.

Figure 22A:
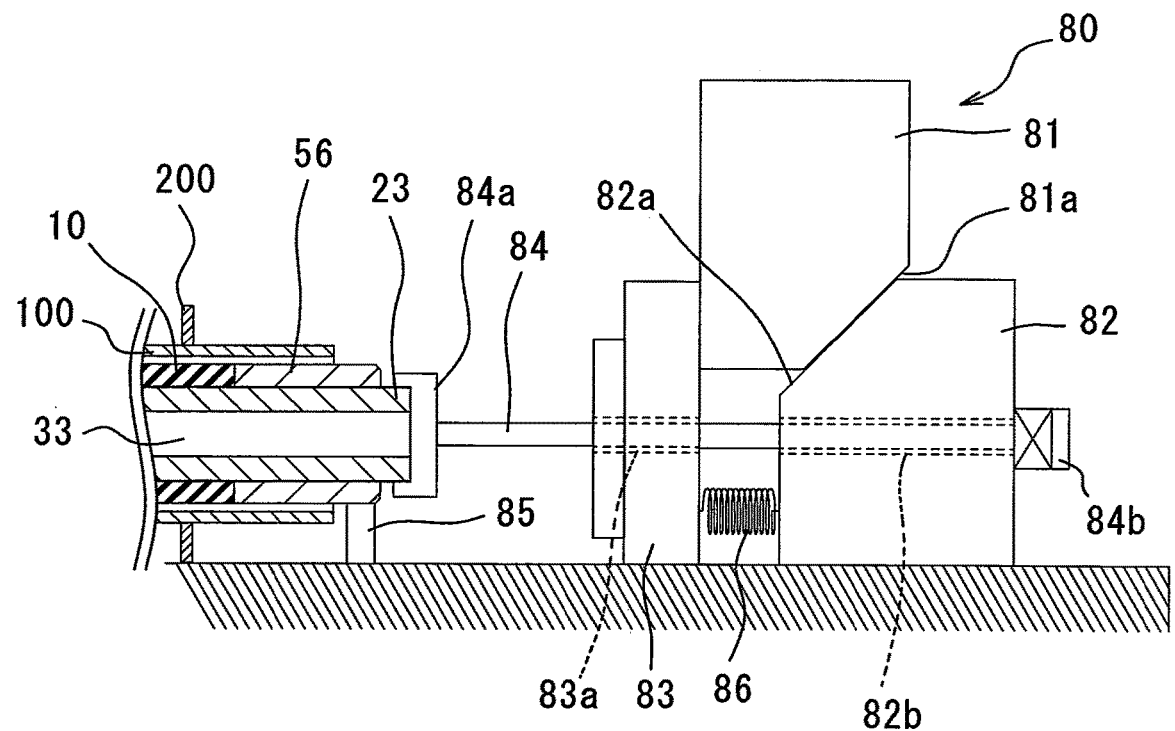
FIG. 22A is a partial sectional view of the motion mechanism before pulling.
Figure 22B:
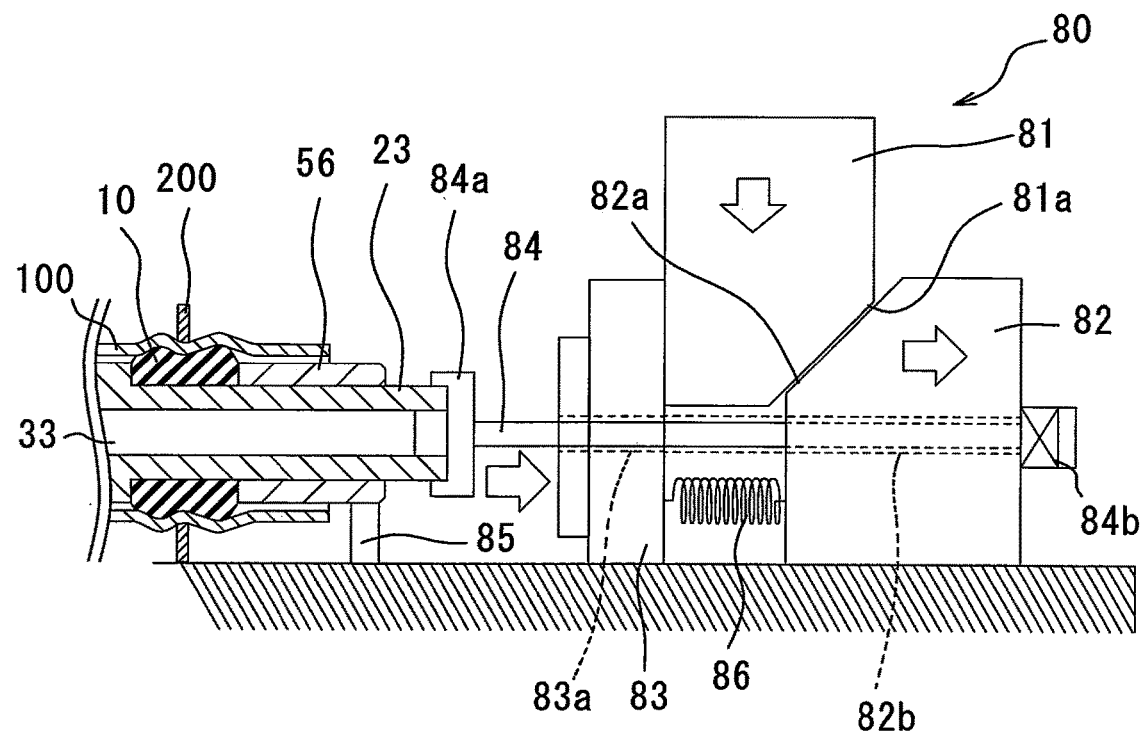
FIG. 22B is a partial sectional view of the motion mechanism after pulling.

FIGS. 22A and 22B show the pulling mechanism 80, which is an example of the motion mechanism M (see FIGS. 21A and 21B). The pulling mechanism 80 includes the cam driver 81, the cam slider 82, the standing wall portion 83, the guide shaft member 84, and a fixture 85. The cam driver 81 is arranged adjacent to the vertically upright standing wall portion 83 fixed to the floor surface, and is movable vertically along the standing wall portion 83. The cam driver 81 has an inclined surface 81a at its lower portion for transmitting a force to the cam slider 82. For the cam driver 81, a press machine or the like that is usually used for pressing or the like may be used. The cam slider 82 has a rail mechanism (not shown) on its lower surface and is movable horizontally. However, other than the rail mechanism, it is possible to adopt any mechanism such as a wheel that reduces the frictional force with the ground when moving. The cam slider 82 has an inclined surface 82a on its upper portion for receiving a force from the cam driver 81. Therefore, the inclined surface 81a of the cam driver 81 and the inclined surface 82a of the cam slider 82 are formed so as to be inclined with respect to each other. The guide shaft member 84 extends horizontally through the cam slider 82 and the standing wall portion 83. The cam slider 82 and the standing wall portion 83 have through-holes 82b and 83a, respectively, for receiving the guide shaft member 84, and the guide shaft member 84 can slide horizontally in the through-holes 82b and 83a. One end of the guide shaft member 84 is mechanically connected to the first tubular member 23 by the coupling mechanism 84a, and the other end is connected to the locking member 84b such as a bolt that is larger than the through-hole 82b outside the cam slider 82 (opposite side of the standing wall portion 83). The fixture 85 fixes the support indenter 56 to the floor surface.

The standing wall portion 83 and the cam slider 82 are elastically connected to each other via a coil spring 86. Accordingly, the cam slider 82 is biased toward the standing wall portion 83.

When a vertical force (downward in the figure) is applied to the cam driver 81, the force is transmitted from the cam driver 81 to the cam slider 82 via the inclined surfaces 81a and 82a. As a result, the cam driver 81 moves vertically (downward in the figure) and the cam slider 82 moves horizontally (rightward in the figure). When the cam slider 82 moves, the guide shaft member 84 having received the force via the locking member 84b also moves together, and pulls the first tubular member 23 via the coupling mechanism 84a. The cam driver 81 and the cam slider 82 are an example of a cam mechanism.

The standing wall portion 83 and the cam slider 82 are elastically connected to each other via a coil spring 86. Accordingly, the cam slider 82 is biased toward the standing wall portion 83.

According to this pulling mechanism, similar to the pressing mechanism 70 (see FIGS. 19A and 19B) in the fifth embodiment, since the cam mechanism can convert the acting direction of the force, the arrangement of the tube body 100 to be swaged and joined can be arbitrarily selected.

Figure 23B:
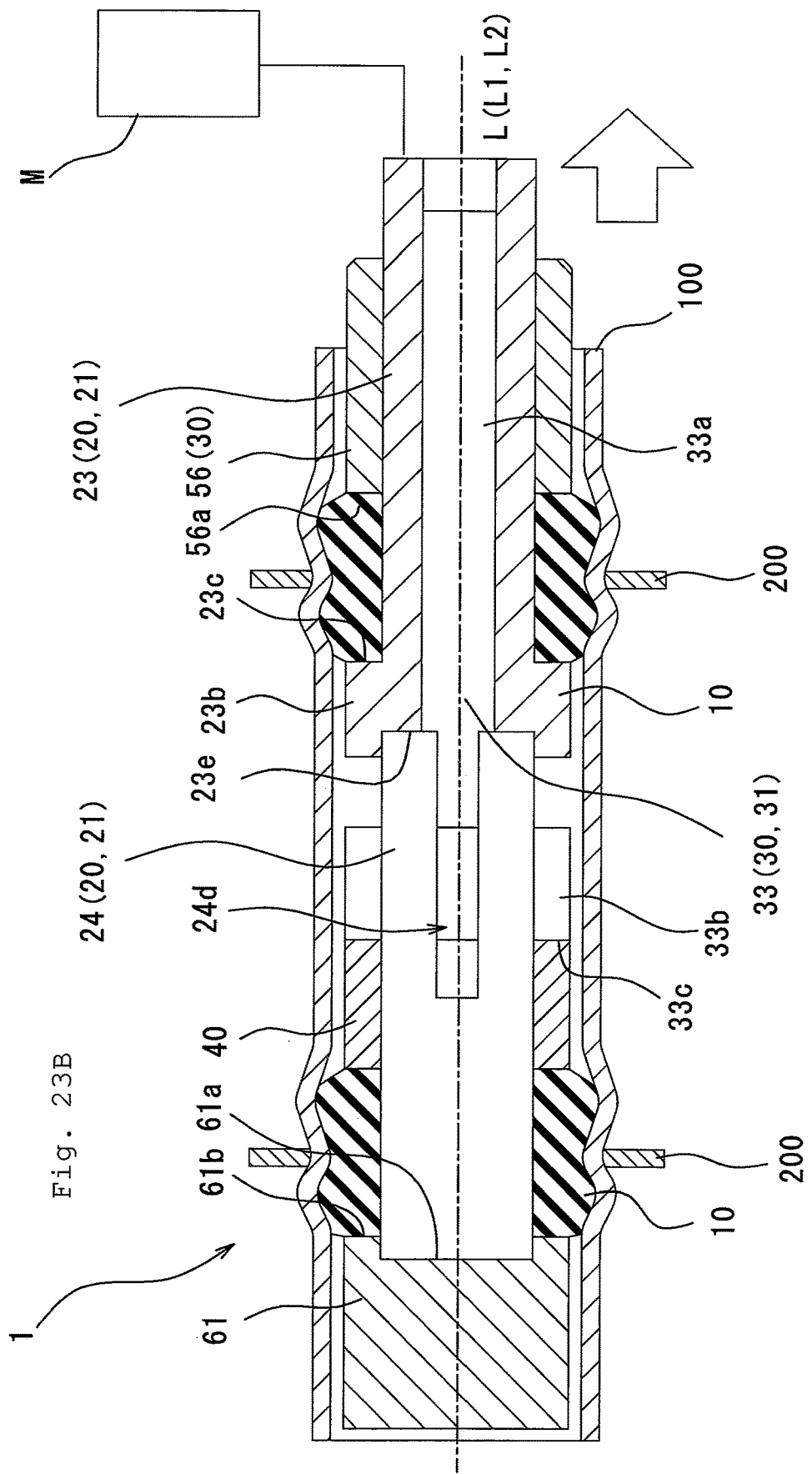
FIG. 23B is a partial sectional view of the first modification of the member joining device according to the sixth embodiment after swaging and joining.

As shown in FIGS. 23A and 23B, as the first modification of the present embodiment, the flange portion 23b may be separated from the first tubular member 23 shown in FIGS. 21A and 21B. That is, the first tubular member 23 may be separated into the second tubular member 24 and a pressing base 61.

The second tubular member 24 is generally cylindrical, and its one end portion is formed with a same slit 24d as that of the first tubular member 23. The pressing base 61 is generally columnar, and includes a concave seat portion 61a where the first tubular member 23 can be inserted and placed. The pressing base 61 includes a pushing surface 61b that is perpendicular to the central axis L and faces the receiving surface 33c of the shaft member 33. The second tubular member 24 and the pressing base 61 are coupled by an arbitrary method such as screw fastening, and can move integrally in the central axis L direction.

According to the present modification, since the first tubular member 23 is separated into the second tubular member 24 and the pressing base 61, the degree of freedom in assembling the member joining device 1 can be improved.

Figure 24A:
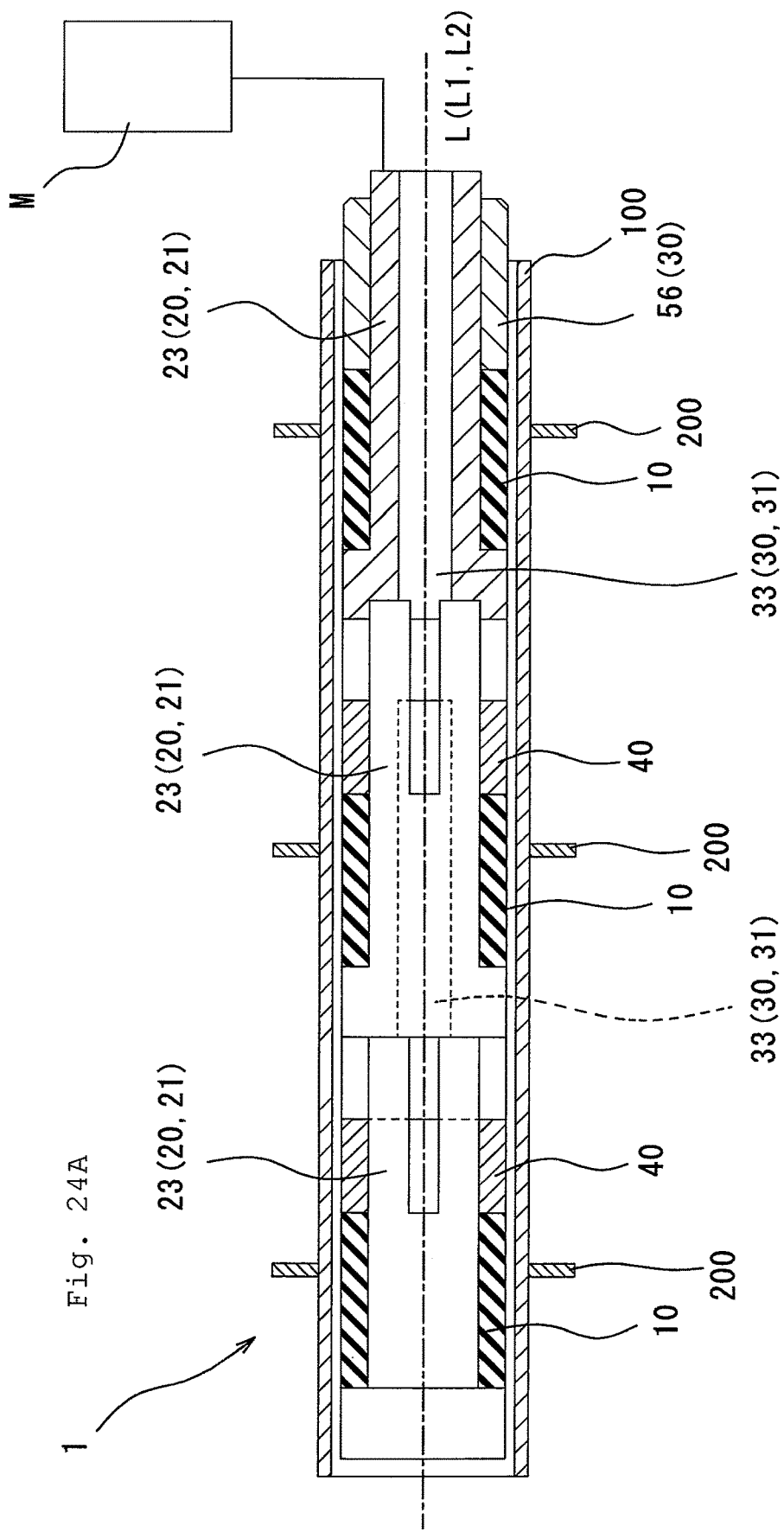
FIG. 24A is a partial sectional view of a second modification of the member joining device according to the sixth embodiment before swaging and joining.
Figure 24B:
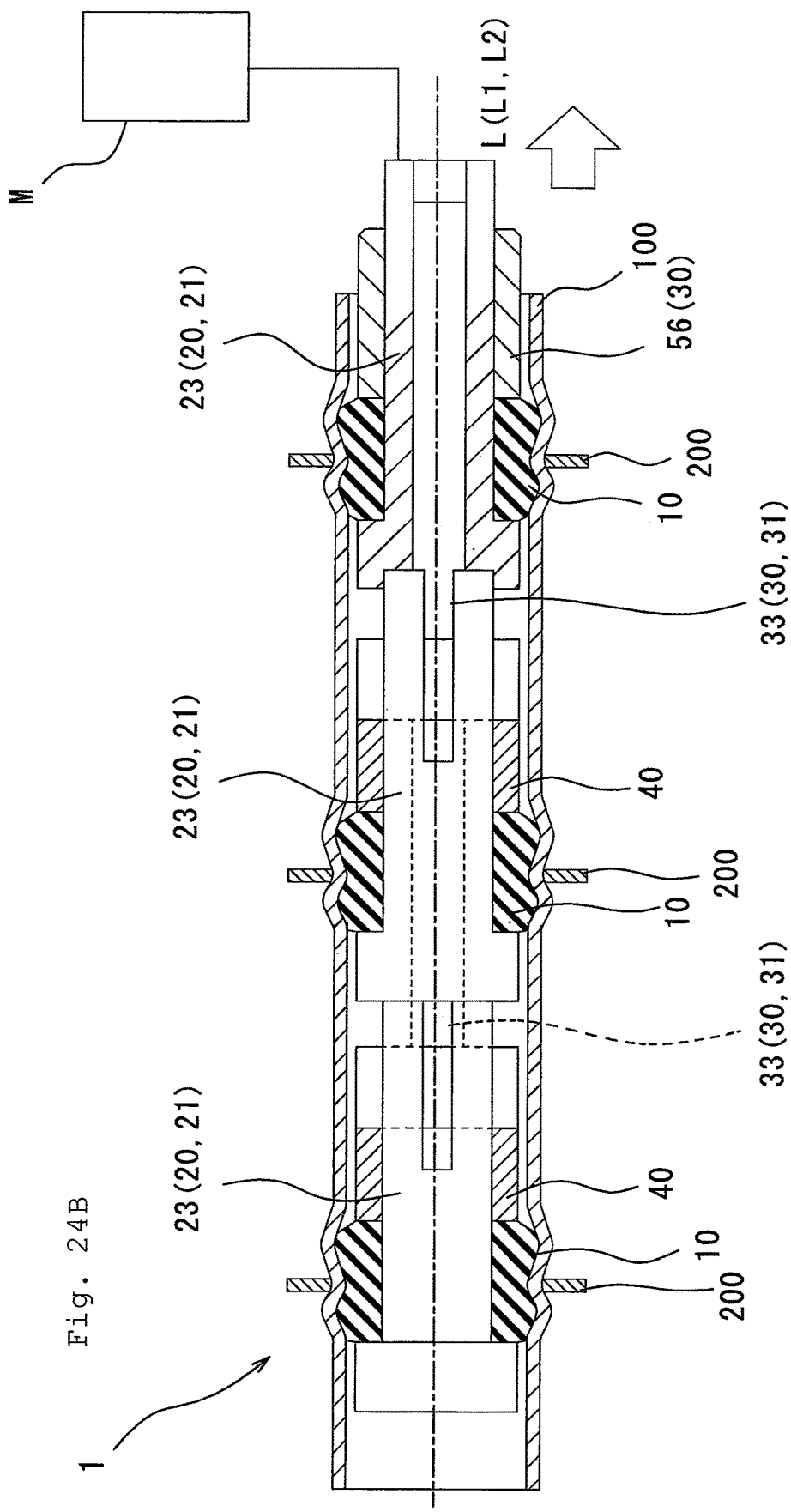
FIG. 24B is a partial sectional view of the second modification of the member joining device according to the sixth embodiment after swaging and joining.

As shown in FIGS. 24A and 24B, in the modification of the present embodiment, three or more joint locations may be provided. The number of joint locations can be increased by continuously assembling the shaft member 33, the first tubular member 23, the annular indenter 40, and the rubber member 10 in addition to the configuration of the present embodiment (FIGS. 22A and 22B).

According to the present modification, three or more locations can be joined at one time. That is, by increasing the continuous configuration of the assembly, it is possible to arbitrarily increase the number of locations that can be joined at one time.

Although specific embodiments of the present invention and modifications thereof have been described above, the present invention is not limited to the above-described embodiments, and various modifications can be made within the scope of the present invention. For example, an appropriate combination of the contents of the individual embodiments may be used as an embodiment of the present invention.

The invention claimed is:

1. A member joining device, comprising:
   a tubular unit that includes a tubular assembly that is fixed and has a first central axis, and a first receiving portion and a second receiving portion whose positions in a first central axis direction are fixed with respect to the tubular assembly;
   a shaft unit that includes a shaft assembly that is inserted into the tubular assembly in a linearly movable manner and has a second central axis that extends in the same direction as the first central axis, and a first pressing portion and a second pressing portion whose positions in a second central axis direction are fixed with respect to the shaft assembly, wherein the first pressing portion and the second pressing portion are positioned radially outside the first central axis of the tubular assembly, the first pressing portion faces the first receiving portion in the first and second central axis directions, and the second pressing portion faces the second receiving portion in the first and second central axis directions;
   a first elastic member arranged radially outside the first central axis of the tubular assembly, between the first pressing portion and the first receiving portion in the first and second central axis directions;
   a second elastic member arranged radially outside the first central axis of the tubular assembly, between the second pressing portion and the second receiving portion in the first and second central axis directions; and
   a motion mechanism that moves the shaft unit in the first and second central axis directions with respect to the tubular unit.

2. The member joining device according to claim 1, wherein
   the tubular assembly is provided with a slit that extends in the first central axis direction; and
   at least one of the first pressing portion and the second pressing portion penetrates the tubular assembly through the slit and protrudes radially outside the first central axis of the tubular assembly, and is arranged to be linearly movable in the slit.

3. The member joining device according to claim 1, further comprising
   at least one of a first annular member that is arranged radially outside the first central axis of the tubular assembly, between the first pressing portion and the first elastic member in the first and second central axis directions, and a second annular member that is arranged radially outside the first central axis of the tubular assembly, between the second pressing portion and the second elastic member in the first and second central axis directions.

4. The member joining device according to claim 1, wherein at least one of the first pressing portion and the second pressing portion is formed point-symmetrically about the first and second central axes in a cross section perpendicular to the first and second central axis directions.

5. The member joining device according to claim 1, wherein the motion mechanism includes a cam mechanism that converts a force acting in a direction other than the first and second central axis directions into a force in the first and second central axis directions.

6. The member joining device according to claim 1, wherein the motion mechanism is a pressing mechanism that presses the shaft unit.

7. The member joining device according to claim 1, wherein the motion mechanism is a pulling mechanism that pulls the shaft unit.

8. A member joining method, comprising:
providing a tube body, at least two wall portions provided with hole portions, and the member joining device according to claim 1;
inserting the tube body through the hole portions of at least the two wall portions;
inserting the member joining device inside the tube body; and
compressing the first elastic member and the second elastic member in the first central axis direction by the member joining device to expand the elastic members radially outside, and thereby expanding and deforming at least two locations of the tube body to join the tube body to the hole portions of at least the two wall portions by press-fitting.

9. A member joining device, comprising:
a tubular unit that includes a tubular assembly that has a first central axis and can linearly move in a first central axis direction, and a first pressing portion and a second pressing portion whose positions in the first central axis direction are fixed with respect to the tubular assembly;
a shaft unit that includes a shaft assembly that is inserted into the tubular assembly and has a second central axis that extends in the same direction as the first central axis, and a first receiving portion and a second receiving portion whose positions in a second central axis direction are fixed with respect to the shaft assembly, wherein the first receiving portion and the second receiving portion are positioned radially outside the first central axis of the tubular assembly, the first receiving portion faces the first pressing portion in the first and second central axis directions, and the second receiving portion faces the second pressing portion in the first and second central axis directions;
a first elastic member arranged radially outside the first central axis of the tubular assembly, between the first pressing portion and the first receiving portion in the first and second central axis directions;
a second elastic member arranged radially outside the first central axis of the tubular assembly, between the second pressing portion and the second receiving portion in the first and second central axis directions; and
a motion mechanism that moves the tubular unit in the first and second central axis directions with respect to the shaft unit.

10. The member joining device according to claim 9, wherein
the tubular assembly is provided with a slit that extends in the first central axis direction; and
at least one of the first receiving portion and the second receiving portion penetrates the tubular assembly at the slit and protrudes radially outside the first central axis of the tubular assembly.

11. The member joining device according to claim 9, further comprising
at least one of a first annular member that is arranged radially outside the first central axis of the tubular assembly, between the first receiving portion and the first elastic member in the first and second central axis directions, and
a second annular member that is arranged radially outside the first central axis of the tubular assembly, between the second receiving portion and the second elastic member in the first and second central axis directions.

12. The member joining device according to claim 9, wherein at least one of the first receiving portion and the second receiving portion is formed point-symmetrically about the first and second central axes in a cross section perpendicular to the first and second central axis directions.

13. The member joining device according to claim 9, wherein the motion mechanism includes a cam mechanism that converts a force acting in a direction other than the first and second central axis directions into a force in the first and second central axis directions.

14. The member joining device according to claim 9, wherein the motion mechanism is a pressing mechanism that presses the tubular unit.

15. The member joining device according to claim 9, wherein the motion mechanism is a pulling mechanism that pulls the tubular unit.

16. A member joining method, comprising:
providing a tube body, at least two wall portions provided with hole portions, and the member joining device according to claim 9;
inserting the tube body through the hole portions of at least the two wall portions;
inserting the member joining device into an inside of the tube body; and
compressing the first elastic member and the second elastic member in the first central axis direction by the member joining device to expand the elastic members radially outside, and thereby expanding and deforming at least two locations of the tube body to join the tube body to the hole portions of at least the two wall portions by press-fitting.

* * * * *